US009074025B2

(12) United States Patent
Brothers et al.

(10) Patent No.: US 9,074,025 B2
(45) Date of Patent: Jul. 7, 2015

(54) REDUCING THE TELOGENIC BEHAVIOR OF HYDROCARBON-CONTAINING SURFACTANTS IN AQUEOUS DISPERSION FLUOROMONOMER POLYMERIZATION

(75) Inventors: Paul Douglas Brothers, Chadds Ford, PA (US); Subhash Vishnu Gangal, Hockessin, DE (US); Dipti Dilip Khasnis, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 81 days.

(21) Appl. No.: 13/292,373

(22) Filed: Nov. 9, 2011

(65) Prior Publication Data

US 2012/0116015 A1 May 10, 2012

Related U.S. Application Data

(60) Provisional application No. 61/411,626, filed on Nov. 9, 2010, provisional application No. 61/434,994, filed on Jan. 21, 2011, provisional application No. 61/434,987, filed on Jan. 21, 2011, provisional application No. 61/498,795, filed on Jun. 20, 2011, provisional application No. 61/498,816, filed on Jun. 20, 2011.

(51) Int. Cl.
| C08F 2/26 | (2006.01) |
| C08F 14/18 | (2006.01) |
| C08F 14/26 | (2006.01) |
| C08F 114/26 | (2006.01) |
| C09D 127/18 | (2006.01) |

(52) U.S. Cl.
CPC . *C08F 14/18* (2013.01); *C08F 2/26* (2013.01); *C08F 14/26* (2013.01); *C08F 114/26* (2013.01); *C09D 127/18* (2013.01)

(58) Field of Classification Search
USPC .......................................... 524/711, 805, 710
See application file for complete search history.

(56) References Cited

U.S. PATENT DOCUMENTS

| 2,559,752 | A | 7/1951 | Berry |
| 3,009,892 | A | 11/1961 | Duddington et al. |
| 3,037,953 | A | 6/1962 | Marks et al. |
| 3,271,341 | A | 9/1966 | Garrison |
| 3,282,875 | A | 11/1966 | Connolly et al. |
| 3,391,099 | A | 7/1968 | Punderson |
| 3,859,262 | A | 1/1975 | Hartwimmer |
| 4,036,802 | A | 7/1977 | Poirier |
| 4,098,978 | A | 7/1978 | Mikofalvy et al. |
| 4,342,675 | A | 8/1982 | Gangal |
| 4,358,545 | A | 11/1982 | Ezzell et al. |
| 4,463,144 | A | 7/1984 | Kojima et al. |
| 4,552,631 | A | 11/1985 | Bissot et al. |
| 4,940,525 | A | 7/1990 | Ezzell et al. |
| 5,530,078 | A | 6/1996 | Felix et al. |
| 5,637,748 | A | 6/1997 | Hong et al. |
| 5,925,705 | A | 7/1999 | Araki et al. |
| 5,959,026 | A | 9/1999 | Abusleme et al. |
| 6,177,196 | B1 | 1/2001 | Brothers et al. |
| 6,300,445 | B1 | 10/2001 | Hong et al. |
| 6,365,684 | B1 * | 4/2002 | McCarthy et al. ............... 526/81 |
| 6,512,063 | B2 | 1/2003 | Tang |
| 6,833,414 | B2 * | 12/2004 | Granel et al. ................. 525/479 |
| 6,841,616 | B2 | 1/2005 | Wille et al. |
| 6,869,997 | B2 | 3/2005 | Wille et al. |
| 7,064,170 | B2 | 6/2006 | Kaspar et al. |
| 7,074,862 | B2 | 7/2006 | Kaspar et al. |
| 7,122,610 | B2 | 10/2006 | Wille et al. |
| 7,220,483 | B2 * | 5/2007 | Coates et al. ................. 428/403 |
| 7,521,513 | B2 | 4/2009 | Tang |
| 7,566,762 | B2 | 7/2009 | Otsuka et al. |
| 7,705,074 | B2 | 4/2010 | Brothers et al. |
| 7,763,680 | B2 | 7/2010 | Aten et al. |
| 7,897,682 | B2 | 3/2011 | Brothers et al. |
| 7,977,438 | B2 | 7/2011 | Brothers et al. |
| 8,080,621 | B2 | 12/2011 | Amin-Sanayei et al. |
| 2005/0090613 | A1 | 4/2005 | Maruya et al. |
| 2006/0128872 | A1 | 6/2006 | Zipplies et al. |
| 2006/0281845 | A1 | 12/2006 | Amin-Sanayei et al. |
| 2006/0281946 | A1 | 12/2006 | Morita et al. |
| 2007/0015864 | A1 | 1/2007 | Hintzer et al. |
| 2007/0015865 | A1 | 1/2007 | Hintzer et al. |
| 2007/0015866 | A1 | 1/2007 | Hintzer et al. |
| 2007/0032591 | A1 | 2/2007 | Durali et al. |
| 2007/0082993 | A1 | 4/2007 | Amin-Sanayei et al. |
| 2007/0135546 | A1 | 6/2007 | Amin-Sanayei et al. |
| 2007/0149733 | A1 | 6/2007 | Otsuka et al. |
| 2007/0270534 | A1 | 11/2007 | Amin-Sanayei et al. |
| 2007/0282044 | A1 | 12/2007 | Cavanaugh et al. |
| 2008/0114121 | A1 | 5/2008 | Brothers et al. |
| 2008/0114143 | A1 | 5/2008 | Brothers et al. |

(Continued)

FOREIGN PATENT DOCUMENTS

| CA | 878571 A | 8/1971 |
| GB | 1299520 | 12/1972 |

(Continued)

OTHER PUBLICATIONS

Kasai et al, J Appl Polymer Sci, 57, 797 (1995).

(Continued)

*Primary Examiner* — Peter D Mulcahy
*Assistant Examiner* — Henry Hu

(57) ABSTRACT

A polymerization process is provided, comprising polymerizing fluoromonomer in an aqueous medium to form a dispersion of fluoropolymer particles in the aqueous medium, said polymerizing being carried out in the presence of (i) polymerization initiator, and (ii) hydrocarbon-containing surfactant stabilizing the dispersion of fluoropolymer particles, the hydrocarbon-containing surfactant being passivated to reduce its the telogenic behavior.

16 Claims, No Drawings

(56) References Cited

U.S. PATENT DOCUMENTS

| | | |
|---|---|---|
| 2008/0125558 A1 | 5/2008 | Tang |
| 2008/0146757 A1 | 6/2008 | Lyons |
| 2008/0262177 A1 | 10/2008 | Lyons |
| 2009/0221776 A1 | 9/2009 | Durali et al. |
| 2010/0160490 A1 | 6/2010 | Leffew et al. |

FOREIGN PATENT DOCUMENTS

| | | |
|---|---|---|
| JP | 2004-359870 | 12/2004 |
| WO | 2007046345 A1 | 4/2007 |
| WO | 2007046377 A1 | 4/2007 |
| WO | 2007046482 A1 | 4/2007 |
| WO | 2007049517 A1 | 5/2007 |
| WO | 2008019155 A1 | 2/2008 |
| WO | 2009013214 A1 | 1/2009 |
| WO | WO-2009/013214 A1 * | 1/2009 |
| WO | 2009126504 A2 | 10/2009 |
| WO | 2011024856 A1 | 3/2011 |
| WO | 2011024857 A1 | 3/2011 |

OTHER PUBLICATIONS

Silberberg, M.S., Chemistry, The Molecular Nature of Matter and Change, 5 Ed., Published by McGraw-Hill Higher Education (2009), Periodic Table on Back of Front Cover.

Ebnesajjad, S., Fluoroplastics, vol. 2 Melt Processible Fluoropolymers, Plastic Design Library (2003), p. 27.

Emulsion Polymerization of Acrylic Monomers, May 1966, Published by Rohm and Haas Company, Philadelphia, PA.

* cited by examiner

REDUCING THE TELOGENIC BEHAVIOR OF HYDROCARBON-CONTAINING SURFACTANTS IN AQUEOUS DISPERSION FLUOROMONOMER POLYMERIZATION

FIELD OF THE INVENTION

This invention relates to the aqueous dispersion polymerization of fluoromonomer and more particularly to reducing the telogenic behavior of the hydrocarbon-containing surfactant that stabilizes the resultant dispersion of polymerized fluoromonomer as particles.

BACKGROUND OF THE INVENTION

The use of fluorosurfactants as the dispersing agent in the aqueous dispersion of polymerization of fluoromonomer is well known, as disclosed e.g. in U.S. Pat. No. 2,559,752 (Berry). Accompanying the use of fluorosurfactants is the desire to remove or recover the fluorosurfactant from the aqueous polymerization medium used in polymerization process. Recent patents propose the use of hydrocarbon-containing surfactants in the polymerization of vinylidene fluoride. The hydrocarbon surfactant is used in combination with fluorosurfactant as disclosed in U.S. Pat. No. 5,925,705 (Araki et al.) or by itself as disclosed in U.S. Pat. No. 6,841,616 Wille et al.), U.S. Pat. No. 7,521,513 (Tang) and U.S. Patent Publications 2006/0281845 (Amin-Sanayei et al.) and 2007/0032591 (Durali et al.).

The problem with the use of hydrocarbon-containing surfactants is that they exhibit telogenic behavior in the polymerization reaction, which is the result of the reaction between the hydrocarbon-containing surfactant and free radicals in the polymerization system. Telogenic behavior is that behavior which inhibits the polymerization reaction. There are many pathways that manifest telogenicity, but regardless of the pathway, telogenic behavior is the behavior which leads to a reduced number of growing polymer chains and thereby a reduced rate of polymer production and/or a significant reduction in polymer molecular weight.

SUMMARY OF THE INVENTION

The present invention solves this problem by the following process:

A process for polymerizing fluoromonomer to form a dispersion of fluoropolymer particles in an aqueous medium in a polymerization reactor, which comprises
adding to the polymerization reactor:
aqueous medium,
polymerization initiator,
fluoromonomer, and
hydrocarbon-containing surfactant,
and passivating the hydrocarbon-containing surfactant. The hydrocarbon-containing surfactant performs the function of stabilizing the dispersion of fluoropolymer particles in the aqueous medium, such that this surfactant can be referred to as the stabilizing surfactant.

This polymerization process, comprising polymerizing fluoromonomer in an aqueous medium in a polymerization reactor to form a dispersion of fluoropolymer particles in the medium, is carried out in the presence of (i) polymerization initiator and (ii) hydrocarbon-containing surfactant stabilizing the dispersion in the aqueous medium in the reactor, the hydrocarbon-containing surfactant being passivated to reduce the telogenic behavior of the hydrocarbon-containing surfactant.

The present invention includes a fluoropolymer dispersion obtainable by the above process, and the fluoropolymer resin obtainable by isolation from this fluoropolymer dispersion.

The hydrocarbon-containing stabilizing surfactant contains C—H bonding and has significant detrimental telogenic effect on the polymerization (reaction) unless the surfactant is passivated, i.e., the polymerization is carried out in the presence of this stabilizing surfactant wherein the surfactant is passivated. The passivation of the surfactant reduces its telogenic effect. Most apparent in the polymerization, without the stabilizing surfactant being passivated, is that the space-time-yield (STY) of the polymerization reaction is reduced as compared to when a relatively non-telogenic fluorosurfactant such as ammonium perfluorooctanoanote is used. In STY, space is the volume of the reactor, time is the time from kickoff of the polymerization reaction until its completion, and yield is the weight of dispersed polymer formed. STY is expressed herein as gm (of dispersed polymer)/l-hr. Another measure of improvement in the use of passivated stabilizing surfactant is the reduction of batch time, which is the time from polymerization kickoff until completion of the polymerization reaction. Preferably, the improvement in terms of increase in STY and/or reduced batch time is at least 10%. The same improvement is obtained when comparing polymerization using hydrocarbon-containing stabilizing surfactant that has not been passivated versus the same surfactant that has been passivated, all other polymerization conditions being the same The passivation of the stabilizing surfactant is preferably carried out by reacting the hydrocarbon-containing surfactant with an oxidizing agent. Preferably, the oxidation agent is hydrogen peroxide or polymerization initiator.

Preferably, this oxidation reaction is carried out in the presence of passivation adjuvant, which acts as a catalyst for the oxidation reaction and which is preferably metal ion. Preferably, the amount of passivation adjuvant is 2 wt % or less than 2 wt % based on the total weight of the hydrocarbon-containing surfactant added to the polymerization reactor. The effect of the adjuvant is to facilitate the oxidation reaction and thus improve usefulness of the surfactant in the context of the polymerization reaction. In effect, the improvement in reduced telogenicity, as indicated by increased STY or reduced batch time, obtained by the passivation of the stabilizing surfactant is preferably enhanced by the presence of the passivation adjuvant enabling the oxidation of the stabilizing surfactant to occur. Thus, the passivation adjuvant is advantageously selected such that it has the effect of enhancing the reduction of the telogenicity of the stabilizing surfactant. Preferably, this improvement is demonstrated by at least 10% with respect to increased STY and/or reduced batch time.

In the polymerization reaction, the hydrocarbon-containing surfactant stabilizes the dispersion of fluoropolymer particles formed during the polymerization. This stabilization preferably minimizes the amount of fluoropolymer particles that irreversibly agglomerate together to form large masses of fluoropolymer that adhere to the interior reactor surface or settle out of the aqueous medium or both. This undispersed fluoropolymer referred to as coagulum herein is typically discarded as waste. Preferably, the passivation adjuvant, such as metal ion, does not destabilize the dispersion of fluoropolymer particles. This avoidance of destabilization can be characterized by the % coagulum resulting from the polymerization being no greater than 5 wt %, and preferably lesser amounts (wt % s) as disclosed hereinafter.

In one preferred practice of the polymerization process, the hydrocarbon-containing surfactant is passivated prior to addition to the polymerization reactor.

In another preferred practice of the polymerization process, the hydrocarbon containing surfactant is passivated during or after addition to the polymerization reactor. In this form of the invention, polymerization initiator preferably is used as an oxidizing agent. Preferably, this process is carried out by adding polymerization initiator to the aqueous medium prior to addition of the stabilizing surfactant to the aqueous medium, whereby the polymerizing commences prior to addition of the stabilizing surfactant to the aqueous medium. In addition, it has been discovered that it is preferable for the addition of the passivation adjuvant, such as metal ion, to the aqueous medium in the polymerization reactor to be delayed until after the commencement of the polymerization reaction. Addition of the passivation adjuvant, such as metal ion, prior to commencement of the polymerization reaction has been observed to result in the formation of a large amount of coagulum. In effect, this premature addition of passivation adjuvant, such as metal ion, has been shown to destabilize the dispersion of fluoropolymer.

Preferably, the time of delay in adding passivation adjuvant, such as metal ion, to the aqueous medium is similar to the time of delay in adding surfactant to the aqueous medium. The passivation adjuvant is preferably present in the aqueous medium in the polymerization reactor at the time when the stabilizing surfactant is added to this aqueous medium. Preferably, the addition of the hydrocarbon-containing surfactant to the aqueous medium is by metering the surfactant into the aqueous medium during the polymerizing occurring after the polymerizing commences, i.e. after the delay in adding surfactant to the aqueous medium. In one embodiment of the present invention, the total amount of the passivation adjuvant, such as metal ion, is added to the aqueous medium at the commencement of the metering of the hydrocarbon-containing surfactant into the aqueous medium. In another embodiment, the passivation adjuvant, such as metal ion, is added to the aqueous medium together with the hydrocarbon-containing surfactant. The passivation adjuvant, such as metal ion, can also be added by metering into the aqueous medium independent of the surfactant. However and whenever the addition of the surfactant and passivation adjuvant, such as metal ion, to the aqueous medium is scheduled, both these ingredients are preferably in aqueous solution when so-added.

The passivation adjuvant used in the process of the present invention is preferably very small. For example, the concentration of passivation adjuvant, which can be metal ion, is preferably 2 wt % or less, based on the weight of the hydrocarbon-containing surfactant in the aqueous medium at the completion of the polymerization reaction. When the surfactant and metal ion are added together in aqueous solution, the same concentration of passivation adjuvant in the solution would apply. The amount of passivation adjuvant, which can be metal ion, in the aqueous medium upon completion of polymerization is preferably 25 ppm or less, based on the amount of water present in the reactor upon completion of the polymerization. These amounts of metal ion also apply when other passivation adjuvants are used, i.e. to the moiety thereof that catalyzes the reaction to provide the reduced telogenic behavior benefit to the hydrocarbon-containing surfactant.

The polymerization process of the present invention carried out in the presence of (i) polymerization initiator and (ii) passivated hydrocarbon containing surfactant is preferably conducted such that, in addition to the advantages of reduced telogenic behavior provided by the process, the amount of coagulum formed by the process is preferably low, no greater than 5 wt % and preferably no greater than the lesser amounts disclosed hereinafter. This applies to a wide range of processes in which the passivated hydrocarbon-containing surfactant is employed.

DETAILED DESCRIPTION OF THE INVENTION

Passivation of the Hydrocarbon-Containing Stabilizing Surfactant

Passivation of the hydrocarbon-containing surfactant added to the polymerization reactor to stabilize the dispersion of fluoropolymer particles in the aqueous medium in the reactor reduces the telogenicity of the surfactant. The passivation is preferably carried out by reacting the hydrocarbon-containing surfactant with an oxidizing agent, preferably in the presence of a passivation adjuvant. The oxidation reaction involves exposure of the surfactant to an oxidizing agent in an aqueous medium which can be the same as or different from the aqueous medium in the polymerization reactor within which the polymerization reaction is conducted. It is also preferred that the hydrocarbon-containing surfactant is anionic. Preferably, the hydrocarbon-containing surfactant is hydrocarbon surfactant.

In one embodiment, the stabilizing surfactant as added into the aqueous polymerization medium in the polymerization reactor is passivated prior to addition into the aqueous medium. Preferably, the stabilizing surfactant is passivated in this embodiment by reacting the surfactant with an oxidizing agent. Preferably, the oxidizing agent is hydrogen peroxide. The reaction to passivate the surfactant is preferably conducted in an aqueous medium at a temperature of no greater than 50° C. This temperature of reaction is in contrast to the temperature of the aqueous medium within which the polymerization reaction is most often carried out, i.e. at a temperature of at least 60° C.

The reduction in telogenicity of the stabilizing surfactant resulting from passivation provides improvements including one or more of the following: 1) reducing the polymerization time to produce the desired fluoropolymer solids content in the aqueous medium, without any appreciable increase in coagulum and/or 2) reducing the time of delay after polymerization kickoff before the stabilizing surfactant can be added to the aqueous medium as will be further discussed hereinafter. Thus, passivation preferably increases the effectiveness of the surfactant. While telogenicity is reduced by passivation, the passivated surfactant still performs its surfactant function of stabilizing the dispersion of fluoropolymer particles in the aqueous medium.

Passivation can be carried out by reacting the stabilizing surfactant with hydrogen peroxide in aqueous solution. A passivation adjuvant for the oxidation reaction is preferably also used to accelerate (catalyze) the oxidation reaction. This adjuvant is preferably metal ion. Preferably, the metal ion is provided in a form which is soluble in the aqueous medium in the polymerization reactor. This solubility can be achieved by the metal ion being in salt form, i.e. the metal ion is the cation of the salt. Preferably the salt is inorganic and the anion of the salt can be any anion that provides this solubility, with or without water of hydration included in the salt. The anion, however, should not have an adverse effect on the polymerization reaction or fluoropolymer product. Examples of preferred anions of the metal salt include sulfate, sulfite, and chloride.

Preferably, the metal of the metal ion has multiple positive valences, sometimes referred to as multiple oxidation states. Examples of metal ion catalysts for the oxidation with hydrogen peroxide include Fe, Mn and Cu. Even with acceleration, the passivation reaction is slow, taking for example at least 30 minutes to completion. A procedure for carrying out the oxidation can be as follows: A solution of the stabilizing surfactant in water is formed. The $Fe^{+2}$ metal ion as iron sulfate hydrate passivation adjuvant is added and dissolved in this solution. The pH of the solution can be adjusted by addition of appropriate reagent to promote the oxidation reaction. The solution is agitated and hydrogen peroxide is slowly added to the solution. The weight ratio of peroxide to $Fe^{+2}$ can be generally from 20:1 to 400:1, preferably from 30:1 to 300:1 and more preferably from 60:1 to 200:1. The weight ratio of peroxide to stabilizing surfactant, such as SDS, can be from 0.15:1 to 3.5:1, preferably from 0.3:1 to 2.6:1, and more preferably, from 0.5:1 to 1.6:1. Upon completion of the hydrogen peroxide addition, the resultant aqueous solution can be used for adding the passivated surfactant to the aqueous polymerization medium during the polymerization reaction in the manner described above. Thus, the water of the aqueous solution is preferably deaerated and deionized, as is done for the aqueous polymerization medium, so that the water added to the reactor along with the passivated surfactant is not detrimental to the polymerization reaction or the fluoropolymer obtained. These proportions of reactants and passivation adjuvant, if present, apply to the passivation of any and all the hydrocarbon-containing surfactants, including hydrocarbon surfactants, mentioned above for stabilization of the fluoropolymer particle dispersion.

When prepared separately from the aqueous polymerization medium, the passivated surfactant is uniform in its composition within the aqueous solution within which the passivation reaction is carried out. This means that the composition of the passivated surfactant fed into the reactor aqueous medium is the same at the end of the polymerization reaction as the composition at the commencement of its feed to the reactor.

Use of hydrogen peroxide to passivate the stabilizing surfactant does not create any salt that would accompany the feed of the passivated surfactant solution to the reactor. Salt when present in sufficient amount during the polymerization reaction can be detrimental, such as by causing increased coagulum.

The temperature of the aqueous solution within which the passivation reaction is carried out using hydrogen peroxide as the oxidizing agent is important. The preferred temperature range that is effective for causing the peroxide to react oxidatively with the stabilizing surfactant is 1 to 50° C., preferably 5 to 45° C. and most preferably 10 to 45° C. As the temperature increases from 45° C., reactivity falls off sharply and is virtually non-existent at temperatures above 50° C. Thus, the desired passivation effect is not obtained at the usual polymerization temperatures of 60° C. and higher. The passivation reaction is therefore preferably carried out separately from the aqueous polymerization medium.

The passivation effect is determined by conducting the oxidation reaction between the stabilizing surfactant and hydrogen peroxide at different aqueous solution temperatures and thereafter using the passivated surfactant as the stabilizing surfactant added to the aqueous polymerization medium in the polymerization of fluoromonomer, and comparing the polymerization (batch) times required to obtain a given fluoropolymer solids content in the aqueous polymerization medium. Preferably the passivation is effective such that the batch time is decreased by at least 10%, preferably at least 20%, more preferably at least 35% and most preferably at least 50% as compared to the same polymerization wherein the stabilizing surfactant is not passivated.

In another embodiment, the stabilizing surfactant is passivated prior to, during or after addition to the aqueous medium in the polymerization reactor using a different oxidizing agent than hydrogen peroxide, each of these being preferred timing for the passivation reaction. In effect, this timing of the passivation is the passivation outside the reactor and inside the reactor. Passivation is preferably carried out during or after addition to the aqueous medium. Passivation most preferably is carried out after the surfactant enters the reactor, so the passivation in the aqueous medium occurs within the reactor. In this embodiment, the passivated stabilizing surfactant is the reaction product of this surfactant and as the oxidizing agent, water-soluble polymerization initiator, preferably the initiator being used to cause the polymerization reaction to form the dispersion of fluoropolymer particles in the aqueous medium. In this embodiment of the process passivation is preferably carried out at the same temperature as the polymerization, preferably 25, 40, 50, 60, or 70 to 120° C.

Preferably, this passivation reaction is carried out in the presence of passivation adjuvant, which is preferably metal ion supplied to this reaction in the form described above with respect to the metal ion used to catalyze the reaction between hydrogen peroxide oxidizing agent and the stabilizing surfactant.

Experimentation has shown that, in the presence of the metal ion, passivation can reduce batch time by 66% and increase STY by 300% (see Experiments 1 and 2 in Table 1) of Example 1.

Preferred metal ions include those of Groups 2-12 of the Periodic Table of the Elements. Such Periodic Table is that which is disclosed on the back of the front cover of M. S. Silverberg, *Chemistry, The Molecular Nature of Matter and Change,* 5 Ed., published by McGraw-Hill Higher Education (2009). The Group numbering for this Table is 1 to 18 in accordance with 2010 IUPAC format, sometimes called "new notation". This Group numbering is referred to herein. This Group numbering applies to vertical columns of elements in the Periodic Table.

The most preferred metal ions are the transition metals, notably those in Groups 3-12 and of these, the most preferred are those in Groups 6-12, even more preferred Groups 7-12 and most preferred those in Groups 7-11. The Periodic Table also has horizontal grouping of elements called Periods that are numbered 1-7, starting with H of the Group 1 elements and ending with Fr of the Group 1 elements as Period 7. Among the transition metals, those in the horizontal Period 4 are most preferred. Included in the term "transition metals" are the "inner transition metal", i.e., the lanthanides and the actinides.

Preferred transition metals include Mn, Fe, Co, Ni, Cu, Zn, Ce, and Ag, with Fe and Cu being most preferred. One of the characteristics of most of the transition metals preferably used in the present invention is that they have multiple positive valences, sometimes referred to as multiple oxidation states. Fe, for example has valences of +2 and +3, and Cu has valences of +1 and +2. The most preferred metal ions are ferrous ion and cuprous ion. The metal ions used to catalyze the polymerization initiator/stabilizing surfactant oxidation reaction can also be used to catalyze the oxidation of the stabilizing surfactant when other oxidizing agents are used such as hydrogen peroxide.

When the oxidizing agent is polymerization initiator and passivation is carried out in the polymerization reactor, the salt providing the metal ion can be added to the aqueous medium in the polymerization reactor as an aqueous solution together with the aqueous solution of hydrocarbon-containing surfactant or independent therefrom, metered into the aqueous medium along with metering of the surfactant into the aqueous medium, metered independently into the aqueous medium, or added all at one time to the aqueous medium. If the polymerization reaction is preceded by the formation of oleophilic nucleation sites as will be described hereinafter, the addition of the passivation adjuvant as metal ion to the aqueous medium is preferably delayed until after the formation of these sites has at least commenced to avoid the formation of excessive coagulum. Thus, addition of the metal ion as passivation adjuvant to the aqueous medium is preferably delayed until after commencement (kickoff) of the polymerization reaction.

The rapidity of the passivation reaction using polymerization initiator together with passivation adjuvant, enables this passivation reaction to be carried out prior to, during or after addition of the stabilizing surfactant to the aqueous medium in the polymerization reactor. The "prior to" passivation reaction can be carried out in the holding vessel for the aqueous solution of the stabilizing surfactant, by adding the passivation adjuvant and polymerization initiator to this vessel. The "during" passivation reaction can be carried out by co-feeding aqueous solutions of the stabilizing surfactant, passivation adjuvant, and polymerization initiator together into the reactor such that these solutions intermix during the addition to the reactor. The passivation reaction during this intermixing is believed to at least commence if not be completed, depending on the length of the reactor feed line containing all three ingredients. The "after" passivation reaction, i.e. passivation within the aqueous medium in the polymerization reactor, as described in the preceding paragraph.

In both passivation embodiments, the hydrocarbon-containing surfactant, including hydrocarbon surfactant, is passivated by reacting the surfactant with an oxidizing agent. In both passivation reactions, the oxidation reaction is preferably carried out in the presence of passivation adjuvant, which is preferably metal ion, in the aqueous medium, which catalyzes the oxidation reaction. The metal ion preferably has multiple positive valences, and the preferred metal ions will depend on which oxidizing agent is used as described above. In this regard, the preferred oxidizing agents are hydrogen peroxide or water-soluble polymerization initiator, preferably selected from those disclosed in the section entitled Polymerization Initiator. The timing of the passivation reaction will depend on the oxidizing agent used and is preferably either prior to the addition of the stabilizing surfactant to the reactor, i.e. the aqueous medium in the reactor, or during this addition to the reactor, or after this addition to the reactor.

The preference for the presence of the passivation adjuvant contemplates that, when the oxidation reaction is carried out outside the reactor, the longer time which is available may enable the reaction to be carried out without the need for the passivation adjuvant. In the case of hydrogen peroxide as the oxidizing agent, even when the passivation adjuvant is present during the reaction, the reaction is slow. Less time is available for the oxidation reaction to occur when the reaction is carried out during or after addition of the stabilizing surfactant into the aqueous medium with the polymerization reactor. Under that circumstance, the presence of the passivation adjuvant is preferable to catalyze the oxidation reaction so that it occurs very quickly, thereby reducing the telogenicity of the stabilizing surfactant as soon as possible after addition to the aqueous medium within the polymerization reactor. Experiments 1 and 2 in Table 1 of Example 1 compare no use and use, respectively, of passivation adjuvant. When the solution of stabilizing surfactant by itself is added to the heated aqueous medium within the polymerization reactor (Experiment 1), the polymerization results in a dispersion of polymer particles and low coagulum formation, but requiring a relatively long period of time for the polymerization reaction to reach the desired solids content. This example employs delayed addition of the stabilizing surfactant to the aqueous medium and the metering of this surfactant into the aqueous medium to reduce the telogenicity of the surfactant. The absence of passivation of the stabilizing surfactant in Experiment 1, however, is revealed by Experiment 2 wherein a solution of the stabilizing surfactant and passivation adjuvant is added to the heated aqueous medium within the polymerization reactor. That the stabilizing surfactant becomes passivated is indicated by the increase in STY by greater than 300%, indicating a great reduction in telogenicity of the stabilizing surfactant arising from the presence of the passivation adjuvant when the stabilizing surfactant reaches the heated aqueous medium. The passivation reduces the telogenicity of the stabilizing surfactant, and presence of the passivation adjuvant preferably enables the passivation to occur timely under the conditions of the polymerization reaction.

Hydrocarbon-Containing Stabilizing Surfactant

The hydrocarbon-containing surfactant employed in the practice of the invention preferably is hydrocarbon surfactant. The hydrocarbon in hydrocarbon surfactant means the carbon atoms present in the surfactant that could be substituted by halogen, such as fluorine or chlorine, are instead substituted by hydrogen, whereby the hydrocarbon surfactant is free of such halogens as fluorine and chlorine. Accordingly, in hydrocarbon surfactant, 100% of the monovalent substituents, as elements from the Periodic Table, on the carbon atoms of the hydrocarbon surfactant are hydrogen.

When the surfactant is hydrocarbon-containing surfactant, it can contain other monovalent substituents on the carbon atoms, such as halogen atoms such as chlorine or fluorine, fluorine being the most prevalent in surfactants for fluoromonomer polymerizations. The presence of halogen atoms in such surfactant may make it desirable to undertake a process for removal or recovery of the compound from the aqueous polymerization medium after completion of the polymerization to satisfy cost and environmental concerns.

Preferably, the monovalent substituents, as elements from the Periodic Table, on the carbon atoms of the hydrocarbon-containing surfactant are at least 50%, more preferably at least 75%, preferably at least 85%, and even more preferably at least 95% hydrogen, the remaining monovalent substituents on the carbon atoms typically being halogen such as fluorine or chlorine.

Both the hydrocarbon surfactant and the hydrocarbon-containing surfactant contain the C—H groups that are telogenic in the polymerization of fluoromonomer. To save any cost of removing or recovering halogen-containing surfactant from the polymerization medium, even though the amount of fluorine in the surfactant may be small, hydrocarbon surfactants are the preferred surfactants for use in the present invention. Thus, the preferred stabilizing surfactants are free of halogen.

The discussion of hydrocarbon-containing surfactant herein includes and applies to hydrocarbon surfactant unless otherwise indicated.

The function of the hydrocarbon-containing surfactant is to stabilize the dispersion of fluoropolymer particles in the aqueous polymerization medium during the polymerization reaction within the polymerization reactor. Stabilization of the dispersed fluoropolymer particles means that these particles are dispersed within the aqueous medium during stirring rather than agglomerating with one another to form coagulum. This dispersion persists upon completion of the polymerization reaction and the stirring is discontinued.

Suitable hydrocarbon-containing surfactants have a hydrophilic portion and a hydrophobic portion on the same molecule. Anionic surfactants have a negatively charged hydrophilic portion such as a carboxylate, sulfonate, or sulfate salt and a long chain hydrocarbon portion, such as alkyl, as the hydrophobic portion are preferred. The hydrocarbon-containing surfactant stabilizes polymer particles by coating the fluoropolymer particles with the hydrophobic portion of the surfactant oriented towards the particle and the hydrophilic portion of the surfactant in the water phase. The anionic surfactant adds to this stabilization, the feature of being charged to provide repulsion of the electrical charges between fluoropolymer particles.

One example of anionic hydrocarbon surfactant is the highly branched C10 tertiary carboxylic acid supplied as Versatic® 10 by Resolution Performance Products.

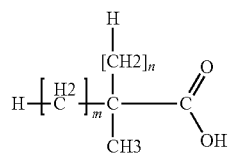

Versatic ® 10
Neodecanoic acid (n + m = 7)

Another useful anionic hydrocarbon surfactant is the sodium linear alkyl polyether sulfonates supplied as the Avanel S series by BASF. The ethylene oxide chain provides nonionic characteristics to the surfactant and the sulfonate groups provide certain anionic characteristics.

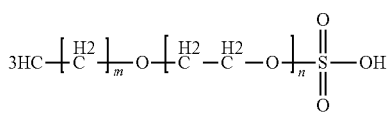

Avanel®
S-70 (n = 7, m = 11-14)
S-74 (n = 3, m = 8)

Another group of hydrocarbon surfactants are those anionic surfactants represented by the formula R-L-M wherein R is an alkyl group containing from 6 to 17 carbon atoms, L is selected from the group consisting of —ArSO$_3^-$, —SO$_3^-$, —SO$_4$—, —PO$_3^-$ and —COO$^-$, and M is a univalent cation selected from H$^+$, Na$^+$, K$^+$ and NH$_4^+$. —ArSO$_3^-$ is aryl sulfonate. Preferred of these surfactants are those represented by the formula CH$_3$—(CH$_2$)$_n$-L-M, wherein n is an integer of 6 to 17 and L is —SO$_3$M, —PO$_3$M or —COOM, and L and M have the same meaning as above. Especially preferred are R-L-M surfactants wherein the R group is an alkyl group having 12 to 16 carbon atoms and wherein L is sulfate, and mixtures thereof, such as sodium dodecyl sulfate (SDS). For commercial use, SDS (sometimes referred to as sodium lauryl sulfate), is typically obtained from coconut oil or palm kernel oil feedstocks, and contains predominately sodium dodecyl sulfate but may contain minor quantities of other R-L-M surfactants with differing R groups.

Another group of surfactants that can be used as hydrocarbon-containing water soluble compounds are the hydrocarbon-containing siloxane surfactants. Such siloxane surfactants and polydimethylsiloxane (PDMS) surfactants in particular, are described in Silicone Surfactants, R. M. Hill, Marcel Dekker, Inc., ISBN: 0-8247-00104. The structure of the siloxane surfactant comprises defined hydrophobic and hydrophilic portions, the latter imparting water solubility to the surfactant. The hydrophobic portion comprises one or more dihydrocarbylsiloxane units, wherein the substitutions on the silicon atoms are entirely hydrocarbon:

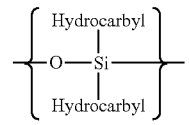

In the sense that the carbon atoms of the hydrocarbyl groups are entirely substituted with hydrogen atoms where they could be substituted by halogen such as fluorine, these hydrocarbon-containing siloxane surfactants can also be considered as hydrocarbon surfactants, i.e. the monovalent substituents on carbon atoms of the hydrocarbyl groups are hydrogen The hydrophilic portion of the siloxane surfactant may comprise one or more polar moieties including ionic groups such as sulfate, sulfonate, phosphonate, phosphate ester, carboxylate, carbonate, sulfosuccinate, taurate (as the free acid, a salt or an ester), phosphine oxide, betaine, betaine copolyol, or quaternary ammonium salt.

Examples of hydrocarbon surfactants that are siloxane-based and that are anionic are such surfactants available from Noveon Consumer Specialties, Inc, a division of Lubrizol Advanced Materials, Inc., as follows:

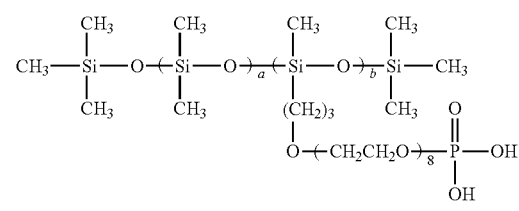

SilSense$^{TM}$ PE-100 Silicone

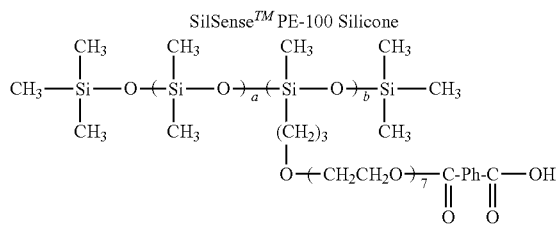

SilSense$^{TM}$ CA-1 Silicone

Another example of hydrocarbon surfactant useful in the present invention is the sulfosuccinate surfactant Lankropol® K8300 available from Akzo Nobel Surface Chemistry LLC. The surfactant is reported to be the following:
Butanedioic acid, sulfo-, 4-(1-methyl-2-((1-oxo-9-octadecenyl)amino)ethyl)ester, disodium salt; CAS No.: 67815-88-7

Additional sulfosuccinate hydrocarbon surfactants useful in the present invention are diisodecyl sulfosuccinate, Na salt, available as Emulsogen® SB10 from Clariant, and diisotridecyl sulfosuccinate, Na salt, available as Polirol® TR/LNA from Cesapinia Chemicals.

Examples of hydrocarbon-containing surfactants useful in the present invention in which only a minor number of monovalent substituents on carbon atoms are fluorine instead of hydrogen are the PolyFox® surfactants available from Omnova Solutions, Inc. described below

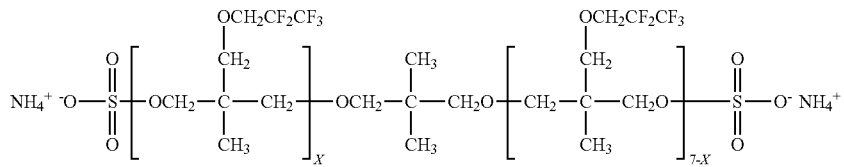

PolyFox™ PF-156A

MW ~ 1900, X = 1 to 7

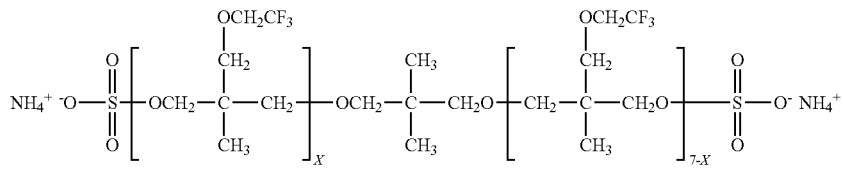

PolyFox™ PF-136A

MW ~ 1600, X = 1 to 7

The preferred surfactants, whether hydrocarbon-containing or hydrocarbon, are the anionic surfactants, preferably anionic hydrocarbon surfactant, and the most preferred of these surfactants are those containing a $C_6$-$C_{17}$ aliphatic group, such as the R-L-M surfactants, described above. Especially preferred is sodium dodecyl sulfate (SDS), including its mixtures of differing R groups in minor quantities as described above.

Polymerization Initiator

The polymerization initiator employed in accordance with the present invention is preferably a water-soluble free-radical polymerization initiator. This initiator is added to the aqueous polymerization medium to cause the polymerization reaction in the pressured-up reactor to commence (kickoff). The amount of initiator added will depend on the fluoromonomer being polymerized and the type of initiator being used.

The kicking off (kickoff) of the polymerization reaction is the commencement of polymerization. For simplicity, this kicking off can be indicated by a reduction in reactor pressure, e.g. by a pressure drop of 10 psi (69 kPa), indicating the commencement of fluoromonomer consumption in the polymerization process and thereby commencement of the polymerization reaction. This amount of pressure drop is taken as meaning that the pressure drop is caused by the consumption of fluoromonomer. One skilled in the art may rely on a smaller pressure drop if there is confidence that the smaller pressure drop is not just a variation in internal reactor pressure that is not the commencement of polymerization. One skilled in the art may rely on a different parameter altogether as indicating the commencement of the polymerization. For example, in a pressure demand system, reduction in reactor pressure is immediately compensated by the flow of monomer into the reactor to maintain pressure. In this system, the flow of a certain amount of pressure demand monomer into the reactor is considered to indicate commencement of the polymerization reaction. Whatever parameter is relied upon, the same parameter should be used from batch to batch so as to provide results, such as batch time, that are comparable.

For polymerization of TFE to PTFE, however, the preferred initiator is organic peracid such as disuccinic acid peroxide (DSP), which requires a large amount to cause kickoff, e.g. at least 200 ppm (based on weight of water in the reactor at the time of kickoff), together with a highly active initiator, such as inorganic persulfate salt, in a smaller amount. The activity of the initiator refers to the ability of the initiator to form free radicals in the aqueous polymerization medium at the temperature of the medium within the reactor, e.g. at least 25, 40, 50, 60, or 70 to 120° C., at which the polymerization reaction is carried out. The selection of initiator and polymerization temperature is preferably matched so that the free-radicals arising from the initiator are caused by the temperature of the aqueous medium, whether the free radicals are thermally induced or that their formation is assisted by the presence of promoter or reducing agent. The initiator added to cause kickoff can be supplemented by additional initiator as may be necessary as the polymerization reaction proceeds. The polymerization initiator added to the reactor prior to kickoff is preferably free of metal ion used in the present invention as the passivation adjuvant.

Fluoromonomer/Fluoropolymer

Fluoropolymer aqueous dispersions formed by this invention are comprised of particles of fluoropolymer made from at least one fluorinated monomer (fluoromonomer), i.e., wherein at least one of the monomers contains fluorine, preferably an olefinic monomer with at least one fluorine or a fluoroalkyl group attached to a doubly-bonded carbon. The fluorinated monomer preferably used in the process of this invention contains at least 35 wt % F, and preferably at least 50 wt % F. These wt % F also preferably apply to the fluoropolymer obtained from the fluorinated monomer. Preferred monomers are independently selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether) and mixtures thereof. A preferred perfluoroalkyl ethylene monomer is perfluorobutyl ethylene (PFBE). Preferred fluorovinyl ethers include perfluoro(alkyl vinyl ether) monomers (PAVE) such as perfluoro(propyl vinyl ether) (PPVE), perfluoro(ethyl vinyl ether) (PEVE), and perfluoro(methyl vinyl ether)

(PMVE). Non-fluorinated olefinic comonomers such as ethylene and propylene can be copolymerized with fluorinated monomers.

Fluorovinyl ethers also include those useful for introducing functionality into fluoropolymers. These include $CF_2=CF-(O-CF_2CFR_f)_a-O-CF_2CFR'_fSO_2F$, wherein $R_f$ and $R'_f$ are independently selected from F, Cl or a perfluorinated alkyl group having 1 to 10 carbon atoms, a=0, 1 or 2. Polymers of this type are disclosed in U.S. Pat. No. 3,282,875 ($CF_2=CF-O-CF_2CF(CF_3)-O-CF_2CF_2SO_2F$, perfluoro(3,6-dioxa-4-methyl-7-octenesulfonyl fluoride)), and in U.S. Pat. Nos. 4,358,545 and 4,940,525 ($CF_2=CF-O-CF_2CF_2SO_2F$). Another example is $CF_2=CF-O-CF_2-CF(CF_3)-O-CF_2CF_2CO_2CH_3$, methyl ester of perfluoro (4,7-dioxa-5-methyl-8-nonenecarboxylic acid), disclosed in U.S. Pat. No. 4,552,631. Similar fluorovinyl ethers with functionality of nitrile, cyanate, carbamate, and phosphonic acid are disclosed in U.S. Pat. Nos. 5,637,748; 6,300,445; and 6,177,196.

The invention is especially useful for polymerizing when producing dispersions of polytetrafluoroethylene (PTFE) including modified PTFE to produce dispersions thereof in an aqueous medium. Polytetrafluoroethylene (PTFE) refers to (a) the polymerized tetrafluoroethylene by itself without any significant comonomer present, i.e. homopolymer and (b) modified PTFE, which is a copolymer of TFE with such small concentrations of comonomer that the melting point of the resultant polymer is not substantially reduced below that of PTFE. The modified PTFE contains a small amount of comonomer modifier which reduces crystallinity to improve processing, examples of such monomers being perfluoroolefin, notably hexafluoropropylene (HFP) or perfluoro(alkyl vinyl ether) (PAVE), where the alkyl group contains 1 to 5 carbon atoms, with perfluoro(ethyl vinyl ether) (PEVE) and perfluoro(propyl vinyl ether) (PPVE) being preferred, chlorotrifluoroethylene (CTFE), perfluorobutyl ethylene (PFBE), or other monomer that introduces bulky side groups into the molecule. The concentration of such comonomer is preferably less than 1 wt %, more preferably less than 0.5 wt %, based on the total weight of the TFE and comonomer present in the PTFE. A minimum amount of at least 0.05 wt % is preferably used to have significant effect. PTFE (and modified PTFE) typically have a melt creep viscosity of at least $1\times10^6$ Pa·s and preferably at least $1\times10^8$ Pa·s and, with such high melt viscosity, the polymer does not flow in the molten state and therefore is not a melt-processable polymer. The measurement of melt creep viscosity is disclosed in col. 4 of U.S. Pat. No. 7,763,680. The high melt viscosity of PTFE arises from its extremely high molecular weight (Mn), e.g. at least $10^6$ and usually well in excess thereof, e.g. Mn of at least $2\times10^6$. Additional indicia of this high molecular weight are as follows: The PTFE can also be characterized by its high melting temperature, of at least 330° C. (1st heating), usually at least 331° C. and most often at least 332° C. (all 1st heat). The non-melt flowability of the PTFE, arising from its extremely high melt viscosity manifests itself as a melt flow rate (MFR) of 0 when measured in accordance with ASTM D 1238 at 372° C. and using a 5 kg weight. The high melt viscosity of the PTFE reduces the ability of the molten PTFE to reform the "as polymerized" crystal structure upon cooling from the first heating. As a result, this high melt viscosity leads to a much lower heat of fusion obtained for the second heat (e.g. up to 55 J/g) as compared to the first heat (e.g. at least 75 J/g) to melt the PTFE, representing a heat of fusion difference of at least 20 J/g. The high melt viscosity of PTFE enables its standard specific gravity (SSG) to be measured as a characterization of extremely high molecular weight. The SSG measurement procedure (ASTM D 4895, also described in U.S. Pat. No. 4,036,802) includes sintering of the SSG sample free standing (without containment) above its melting temperature without change in dimension of the SSG sample. The SSG sample does not flow during the sintering.

The process of the present invention is also useful in polymerizing dispersions of low molecular weight PTFE, which is commonly known as PTFE micropowder, so as to distinguish from the PTFE described above. While the molecular weight of PTFE micropowder is low relative to PTFE, i.e. the molecular weight (Mn) is generally in the range of $10^4$ to $10^5$ The result of this lower molecular weight of PTFE micropowder is that it has fluidity in the molten state, in contrast to PTFE which is not melt flowable. PTFE micropowder has melt flowability, which can be characterized by a melt flow rate (MFR) of at least 0.01 g/10 min, preferably at least 0.1 g/10 min and more preferably at least 5 g/10 min, and still more preferably at least 10 g/10 min., as measured in accordance with ASTM D 1238, at 372° C. using a 5 kg weight on the molten polymer.

While the low molecular weight of PTFE micropowder imparts melt flowability to the polymer, the PTFE micropowder by itself is not melt fabricable, i.e. an article molded from the melt of PTFE micropowder is useless, by virtue of extreme brittleness. Because of its low molecular weight (relative to non-melt-flowable PTFE), it has no strength. An extruded filament of PTFE micropowder is so brittle that it breaks upon flexing. Generally, compression molded plaques cannot be made for tensile or flex testing of the PTFE micropowder used in the present invention, because the plaques crack or crumble when removed from the compression mold, whereby neither the tensile property nor MIT Flex Life can be tested. In effect, this polymer has no (0) tensile strength and an MIT Flex Life of zero cycles. In contrast, PTFE is flexible, rather than brittle, as indicated e.g. by an MIT flex life (ASTM D-2176, using an 8 mil (0.21 mm) thick compression molded film) of at least 1000 cycles, preferably at least 2000 cycles.

The invention is useful for producing dispersions of melt-processible fluoropolymers that are also melt-fabricable. Melt-processible means that the fluoropolymer can be processed in the molten state, i.e., fabricated from the melt using conventional processing equipment such as extruders and injection molding machines, into shaped articles such as films, fibers, and tubes. Melt-fabricable means that the resultant fabricated articles exhibit sufficient strength and toughness to be useful for their intended purpose. This sufficient strength may be characterized by the fluoropolymer by itself exhibiting an MIT Flex Life of at least 1000 cycles, preferably at least 2000 cycles, measured as described above. The strength of the fluoropolymer is indicated by it not being brittle. The fluoropolymers described hereinafter are melt processible and melt fabricable unless otherwise indicated.

Examples of such melt-processible fluoropolymers include homopolymers such as polychlorotrifluoroethylene and polyvinylidene fluoride (PVDF) or copolymers of tetrafluoroethylene (TFE) and at least one fluorinated copolymerizable monomer (comonomer) present in the polymer usually in sufficient amount to reduce the melting point of the copolymer substantially below that of PTFE, e.g., a melting temperature no greater than 315° C. Another group of preferred fluoroplastics are those in which the polymer chain is composed of greater than 75 wt % perfluoromonomer units, preferably TFE, HFP, and mixtures thereof, preferably at least 78 wt % of such recurring units, more preferably at least 80 wt % of such recurring units, and most preferably at least 85 wt % of such units. TFE is the preferred perfluoromonomer recurring unit. The remaining recurring units, to total 100 wt % of the copolymer, can be selected from C—H containing comonomer or halocarbon comonomer, preferably perfluoroolefins HFP and PAVE described above to form perfluoroplastics. Preferred fluoroplastics comprise 25 wt % $VF_2$ or less, more preferably, 20 wt % or less, even more preferably 15 wt % or less.

A melt-processible TFE copolymer typically incorporates an amount of comonomer into the copolymer in order to provide a copolymer which has a melt flow rate (MFR) of 0.1 to 200 g/10 min as measured according to ASTM D-1238 using a 5 kg weight on the molten polymer and the melt temperature which is standard for the specific copolymer. MFR will preferably range from 1 to 100 g/10 min, most preferably about 1 to about 50 g/10 min. Additional melt-fabricable fluoropolymers are the copolymers of ethylene (E) or propylene (P) with TFE or CTFE, notably ETFE and ECTFE.

A preferred melt-processible copolymer for use in the practice of the present invention comprises at least 40-99 mol % tetrafluoroethylene units and 1-60 mol % of at least one other monomer. Preferred comonomers with TFE to form perfluoropolymers are perfluoroolefin having 3 to 8 carbon atoms, such as hexafluoropropylene (HFP), and/or perfluoro (alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer); TFE/HFP/PAVE wherein PAVE is PEVE and/or PPVE, MFA (TFE/PMVE/PAVE wherein the alkyl group of PAVE has at least two carbon atoms) and THV (TFE/HFP/$VF_2$).

Further useful polymers are film forming polymers of polyvinylidene fluoride (PVDF) and copolymers of vinylidene fluoride as well as polyvinyl fluoride (PVF) and copolymers of vinyl fluoride.

All these melt-processible fluoropolymers can be characterized by MFR as recited above for the melt-fabricable TFE copolymers, i.e. by the procedure of ASTM 1238 using standard conditions for the particular polymer, including a 5 kg weight on the molten polymer in the plastometer for the MFR determination of PFA and FEP. All of the fluoropolymers described above are fluoroplastics, including perfluoroplastics such as PTFE, modified PTFE, PFA and FEP mentioned above, not fluoroelastomers. Perfluoroplastics are polymers in which the monovalent substituents on the carbon atoms forming the chain or backbone of the polymer are all fluorine atoms, with the possible exception of end groups, comonomer, or pendant groups from the polymer backbone. Preferably the end groups, comonomer, or pendant group structure will impart no more than 2 wt % C—H moiety, more preferably no greater than 1 wt % C—H moiety, with respect to the total weight of the perfluoroplastic. Preferably, the hydrogen content, if any, of the perfluoroplastic is no greater than 0.2 wt %, based on the total of the perfluoroplastic. Preferably, the hydrogen content, if any, of the perfluoroplastic is no greater than 0.2 wt %, based on the total weight of the perfluoroplastic. The fluoroplastics and perfluoroplastics most often exhibit crystallinity and a melting temperature such that they are not fluoroelastomers. Preferred fluoroplastics and perfluoroplastics have sufficient crystallinity that they have a heat of fusion by differential scanning calorimetry (DSC) of at least 9 J/gm as determined according to ASTM D-4591 or, if amorphous, such as TFE/PDD copolymer, have a glass transition temperature of 50° C. or greater. Additional distinction from fluoroelastomers is that the fluoroplastics do not exhibit the fluoroelastomer characteristics of glass transition temperature below 25° C. and the combination of low flex modulus, high elongation, and once crosslinked, rapid recovery from deformation.

The invention is also useful when producing dispersions of fluorocarbon elastomers (fluoroelastomers). These elastomers typically have a glass transition temperature below 25° C. and exhibit little or no crystallinity at room temperature. Fluoroelastomer made by the process of this invention typically are copolymers containing 25 to 75 wt %, based on total weight of the fluoroelastomer, of copolymerized units of a first fluorinated monomer which may be vinylidene fluoride (VF2) or tetrafluoroethylene (TFE). The remaining units in the fluoroelastomers are comprised of one or more additional copolymerized monomers, different from the first monomer, selected from the group consisting of fluorinated monomers, hydrocarbon olefins and mixtures thereof. Fluoroelastomers prepared by the process of the present invention may also, optionally, comprise units of one or more cure site monomers. When present, copolymerized cure site monomers are typically at a level of 0.05 to 7 wt %, based on total weight of fluorocarbon elastomer. Examples of suitable cure site monomers include: i) bromine-, iodine-, or chlorine-containing fluorinated olefins or fluorinated vinyl ethers; ii) nitrile group-containing fluorinated olefins or fluorinated vinyl ethers; iii) perfluoro(2-phenoxypropyl vinyl ether); and iv) non-conjugated dienes.

Preferred TFE based fluoroelastomer copolymers include TFE/PMVE, TFE/PMVE/E, TFE/P and TFE/P/$VF_2$. Preferred $VF_2$ based fluorocarbon elastomer copolymers include $VF_2$/HFP, $VF_2$/HFP/TFE, and $VF_2$/PMVE/TFE. Any of these elastomer copolymers may further comprise units of cure site monomer.

In one embodiment, the preferred fluoropolymer of the dispersion of fluoropolymer particles made by the process of the present invention is selected from the group consisting of PTFE, modified PTFE, melt-processible copolymer comprising at least 60-98 wt % tetrafluoroethylene units and 2-40 wt % of at least one other monomer, and fluoroelastomer copolymer comprising 25-70 wt % of copolymerized units of first fluorinated monomer selected from the group consisting of vinylidene fluoride and tetrafluoroethylene and remaining copolymerized units of one or more copolymerized monomers, different from the first monomer, selected from the group consisting of fluorinated monomers, hydrocarbon olefins and mixtures thereof.

From the fluoropolymers disclosed above, the preferred fluoropolymers are the perfluoroplastics, these being the most difficult to make, because of their high molecular weight and susceptibility to telogenic activity being present in the aqueous polymerization medium preventing this high molecular weight from being obtained. Exemplary of these high molecular weight fluoroplastics is PTFE. The use of hydrocarbon surfactants in the process of the present invention would be expected to prevent the high molecular weight of PTFE from being obtained. Notwithstanding this expectation, PTFE having an Mn of at least 1,000,000 is obtained by the process of the present invention. Fluoro-elastomers gain their dimensional integrity by crosslinking, whereby it is satisfactory if the polymerization process makes a lower molecular weight polymer, i.e. the presence of telogenic activity in the aqueous polymerization medium is more tolerable to make fluoroelastomer than fluoroplastic, such as perfluoroplastic. Fluoroelastomers (uncrosslinked) have an Mn that is a small fraction of the molecular weight of PTFE.

Polymerization Process

The polymerization process is carried out in a polymerization reactor. The reactor is equipped with a stirrer for the aqueous medium within the reactor to provide eventual sufficient interaction between free-radicals and monomers such as TFE at and after kickoff of the polymerization reaction for desirable reaction rates and uniform incorporation of comonomers if employed in the polymerization reaction. The reactor preferably includes a jacket surrounding the reactor so that the reaction temperature may be conveniently controlled by circulation of a controlled temperature heat exchange medium. The aqueous medium is preferably deionized and deaerated water. The same is true for the water in any solution added to the reactor, such as solutions containing polymerization initiator, metal ion as passivation adjuvant, and surfactant to stabilize the dispersion of fluoropolymer particles in the aqueous polymerization medium. The temperature of the reactor and thus of the aqueous medium will be from 25 to 120° C., preferably 40 to 120° C., more preferably 50-120° C., even more preferably 60 to 120° C. and most preferably 70 to 120° C.

In operation, the reactor is pressured up with fluoromonomer. Pressuring up the reactor is the addition of fluoromonomer to the reactor to increase the reactor internal pressure to or near the pressure at which the polymerization reaction will commence and/or be carried out (operating pressure). Typical operating pressures that will be used will be from 30 to 1000 psig (0.3 to 7.0 MPa), preferably from 1 to 800 psig (0.1 to 5.6 MPa). An aqueous solution of free-radical polymerization initiator can then be pumped into the reactor in sufficient amount to cause kicking off of the polymerization reaction, i.e. commencement of the polymerization reaction, proof of which is described above. Relatively inactive fluoromonomer such as hexafluoropropylene (HFP), which is intended for copolymerization in the polymerization reaction, such as with TFE, can already be present in the reactor prior to pressuring up with the more active TFE fluoromonomer. After kickoff, additional fluoromonomer is fed into the reactor to maintain the internal pressure of the reactor at the operating pressure. The aqueous medium is stirred to obtain the polymerization reaction rate and uniform incorporation of comonomer, if present, desired.

In accordance with a preferred form of the invention, the presence of the metal ion as passivation adjuvant in effect reduces the telogenic activity of the hydrocarbon-containing surfactant. In one embodiment of the present invention, addition of the stabilizing surfactant is delayed until after the kickoff has occurred. The amount (timing) of the delay will depend on the surfactant being used and the fluoromonomer being polymerized. The function of the hydrocarbon-containing surfactant is to stabilize the perfluoropolymer particles formed during the polymerization process. In a preferred form of the invention, addition of the hydrocarbon-containing surfactant to the aqueous polymerization medium is at a time in the polymerization process and at a rate that reduces its telogenic activity while still maintaining surface activity to provide the stabilizing effect for the dispersion of fluoropolymer particles formed during the polymerization.

For preferred embodiments of the invention in which the hydrocarbon-containing surfactant is fed into the reactor as the polymerization proceeds, i.e., metered, it is preferred that the commencement of the addition of hydrocarbon-containing surfactant to the aqueous polymerization medium be delayed until after kickoff of the polymerization reaction has occurred. This delay is beneficial in reducing any telogenic effect of the surfactant on the polymerization. This delay can be measured in terms of the concentration of fluoropolymer formed in the aqueous polymerization medium before (at the time of) addition of the stabilizing surfactant to the aqueous medium commences, and can be represented by the following equation:

$$\text{Concentration of fluoropolymer in wt \%} = ([A \div (B+A)] \times 100,$$

wherein A is the weight of dispersed fluoropolymer formed before addition of the surfactant commences and B is the weight of water in the polymerization reactor at the time stabilizing surfactant addition commences. The water additions comprising B (in the equation above) to the reactor may include dissolved ingredients such as initiator. For simplicity, the water additions are each considered to be entirely of water, not taking into account the weight of the dissolved ingredient. By way of example, the 80 ml of solution containing 0.5 gm of ammonium persulfate initiator per liter of water mentioned under the general polymerization procedure under the EXAMPLES is counted solely as 80 gm of water in the determination of the total amount of water present in the above-mentioned equation. A can be determined by the amount (weight) of fluoromonomer consumed up until the time the surfactant addition commences, since no coagulum will have formed so early in the polymerization reaction. When the fluoromonomer(s) is the monomer that maintains the pressure (operating) of the polymerization process within the reactor, the amount of fluoromonomer consumed is the amount fed to the reactor to maintain (makeup) this pressure until stabilizing surfactant addition commences. When comonomer is present and its amount is not determined by makeup to maintain pressure, it is assumed that the incorporation of the comonomer into the fluoropolymer is uniform. The amount of polymer produced (A) can then be calculated by the consumed fluoromonomer, e.g. TFE, feed to the reactor divided by the quantity 1 minus the weight fraction of comonomer in the fluoropolymer. B is the sum of the weight of all water additions to the reactor until surfactant addition commences. Thus, B includes the weight of the initial amount of water charged to the reactor and all additional water charges, such as in the form of solutions of initiator pumped into the aqueous medium up until the time surfactant addition commences.

It has been found that premature addition of the hydrocarbon-containing stabilizing surfactant to the aqueous polymerization medium excessively inhibits the polymerizing of fluoromonomer to fluoropolymer, especially fluoroplastics, particularly perfluoroplastics, such as PTFE. Thus, it is preferred that the concentration of fluoropolymer in the aqueous polymerization medium reach at least 0.6 wt % before the surfactant addition commences, more preferably at least 0.7, or at least 0.8, or at least 1 wt %. Even more preferably, the fluoropolymer concentration is at least 1.2 wt % and most preferably at least 1.6 wt %. For melt processible perfluoroplastics such as FEP and PFA, the concentration is preferably at least 2 wt %, and for PTFE, the concentration is preferably at least 1 wt %, more preferably at least 1.6 wt %. The maximum delay in commencing the metering of the stabilizing surfactant will depend on the fluoromonomer(s) being polymerized and the coagulum wt % considered acceptable for the solids content of the dispersion to be obtained.

When addition of the hydrocarbon-containing stabilizing surfactant, preferably hydrocarbon surfactant, to the aqueous polymerization medium in the polymerization reactor begins, this addition is preferably done by metering the surfactant into the aqueous medium at a rate that reduces the telogenic activity of the stabilizing surfactant while maintaining surface activity to form a stable dispersion of fluoropolymer particles in the aqueous polymerization medium. Exemplary of the metering rate is 0.005 to 1.4 g/l-hr, often 0.005 to 1.0 g/l-hr, and more often 0.01 to 0.8 g/l-hr. In the expression g/l-hr, g is the weight in grams of the surfactant by itself, l is the reactor volume in liters, and hr is the unit of time. The metering rates apply to the surfactant not to the aqueous solution within which the surfactant is present as added to the aqueous medium in the polymerization reactor. The time increments for the addition of the surfactant are preferably at least every 20 minutes, more preferably, at least every 10 min, more preferably at least every 5 min, and/or most preferably, continuously, during the polymerization reaction. The amount of surfactant added and its timing of addition will depend on the fluoromonomer(s) being polymerized. Too little surfactant results in increased coagulum, and too much surfactant slows down the polymerization reaction. Each of these metering rates can be used with each of the weight % concentrations of fluoropolymer mentioned above with respect to the commencement of the surfactant addition.

While delayed addition and metering are the preferred practice in adding the surfactant to the aqueous polymerization medium in a process in accordance with the invention, it is desirable that the delay and metering are appropriate to provide the needed stabilization effect for the dispersion of fluoropolymer particles. The reduction in telogenicity obtained by metering the stabilizing surfactant to the aqueous polymerization medium after commencement of the polymerization reaction preferably provides additional substantial benefit to the passivation of the stabilizing surfactant and the presence of passivation adjuvant, preferably the metal ion, in the aqueous polymerization medium along with the stabilizing surfactant, whether the passivation is carried out outside the polymerization reactor or within the reactor during polymerization.

As stated above, the reduction in telogenic behavior due to the passivation of the stabilizing surfactant and the preferred presence of the passivation adjuvant, such as metal ion, catalyzing the oxidation reaction and promoting passivation, can be characterized by an increase in STY of at least 10%. Preferably the increase in STY more preferably is at least 20% and most preferably, at least 30% as compared to the same polymerization, but without the stabilizing surfactant being passivated. Experiment 2 in the Examples which follow obtains an STY improvement of greater than 300%. Preferably, the identity of the passivation adjuvant, preferably the metal ion, and the amount used is selected to be effective to reduce the telogenic behavior, especially by the quantitative productivity increases mentioned above. While improvement is obtained with as much as 25 ppm metal ion as passivation adjuvant, based on the total weight of water present in the reactor upon the completion of the polymerization, excellent results are also obtained with smaller amounts, e.g. up to 20 ppm, or up to 15 ppm, or preferably up to 10 ppm. The minimum amount of metal ion will depend on its type, polymerization conditions, and the improvement result desired. Generally at least 0.5 ppm of metal ion is desired, preferably at least 1 ppm, on the same basis as mentioned above. Each of these minimum amounts of metal ion can be used with any of the maximum amounts of metal ion mentioned above to formulate preferred ranges on metal ion. All these amounts and ranges can apply to the passivation adjuvant in general, i.e. that moiety thereof that enhances the reduction in telogenic behavior to the surfactant as a result of the passivation of the stabilizing surfactant The addition of the passivation adjuvant such as metal ion, to and its presence in the aqueous polymerization medium in accordance with the present invention is preferably a controlled activity, i.e., the adjuvant is added in measured amounts to the aqueous medium. Thus, such addition and presence preferably do not arise from or are altered by the polymerization environment, e.g. from the possibility of impure water being added to the reactor or from the reactor itself.

From the description above, it is apparent that the preferred amounts of passivation adjuvant, preferably metal ion, are small relative to water present in the polymerization reactor. The amount of passivation adjuvant, preferably metal ion, relative to the amount of stabilizing surfactant used is also preferably small. Preferably, such amount is 1.5 wt % or less of the weight of stabilizing surfactant used during the entire polymerization reaction, more preferably 1.25 wt % or less. Notwithstanding the fact that these amounts of passivation adjuvant, preferably metal ion, are small, the result is a profound positive effect on the polymerization process to provide an increase in STY.

The amount and identity of fluoromonomer present at kickoff will depend on the fluoropolymer being made. In the case of modified PTFE, the modifying monomer will generally all be added at the time of the precharge to the reactor. The same can be true for comonomer used in the polymerization with TFE to form melt processible fluoropolymers, although comonomer can be added as the polymerization reaction proceeds. Once polymerization begins, additional TFE (and comonomer, if any) is added to maintain the reactor pressure desired. Chain transfer agents can be added when molecular weight control is desired For some polymerizations, additional polymerization initiator may be added during the polymerization.

After completion of the polymerization (typically several hours) when the desired amount of dispersed fluoropolymer or solids content has been achieved, the feeds are stopped, the reactor is vented, and the raw dispersion of fluoropolymer particles in the reactor is transferred to a cooling or holding vessel. The completion of the polymerization is quantified by the amount of makeup monomer used to maintain reactor pressure for the polymerization reaction. When that amount is reached, which provides a known solids content, the stopping of the monomer feed and cessation of stirring of the aqueous medium marks the completion of the polymerization reaction. In one embodiment of the present invention, as described above, the polymerization process is a batch process. In another embodiment, the polymerization process can be continuous.

The solids content of the dispersion of fluoropolymer particles produced by the process of the invention is preferably at least 10% by weight, preferably greater than 16 wt %. More preferably, the fluoropolymers solids content is at least 20% by weight. Solids content is the weight % of fluoropolymer particles dispersed in the aqueous medium, based on the combined weight of these fluoropolymer particles and total water added to the aqueous medium in the reactor. The total water is the total amount of water added during polymerization process, including any water added to the reactor prior to kickoff of the polymerization reaction. The calculation of solids content is as follows: 100×[weight of fluoropolymer particles in the dispersion÷(weight of the fluoropolymer particles+total weight of water)]. Solutions of ingredients added to the aqueous medium, such as initiator solution, are considered to be entirely of water in the calculation of solids content. Solids contents up to 33-35 wt % are obtainable by any process of the present invention. Surprisingly, much higher solids contents, e.g. of 45 wt % and greater than 45 wt % are also obtainable as described in EXAMPLE 8. Solids contents up to 60 wt % and even up to 65 wt % are obtainable. In the Examples, solids content is reported as Dispersion % solids or simply as % solids.

Preferably, passivation adjuvant, which can be metal ion as described above, does not destabilize the dispersion. Not destabilizing the dispersion can be characterized by the coagulum in the aqueous medium upon completion of the polymerizing being not greater than 5 wt % of the total amount of fluoropolymer made. In the preferred process of the invention, polymerizing produces no greater 3 wt %, even more preferably no greater than 2 or 1 wt %, most preferably no greater than 0.5 wt % of fluoropolymer present as coagulum. These low coagulum contents result from the stabilizing effectiveness of the passivated stabilizing surfactant however and whenever the surfactant is added to the aqueous polymerization medium. These coagulum contents also refer to any of the solids contents disclosed herein. The maximum solids content is preferably controlled to minimize the amount of coagulum formed described above. The oxidizing agent together with passivation adjuvant, preferably the metal ion, in amount and when and how added to the aqueous medium, is preferably effective to reduce telogenic behavior of the stabilizing surfactant, without destabilizing the fluoropolymer dispersion, thereby enabling these low coagulum amounts to be achieved. In other words, while telogenicity is reduced by passivation, the passivated surfactant still performs its surfactant function of stabilizing the dispersion of fluoropolymer particles in the aqueous medium. The preferred particle size (Dv(50)) of the fluoropolymer particles in the aqueous dispersion thereof is preferably from 100 to 300 nm.

It is preferred that the polymerization process is conducted in an aqueous medium that is essentially free of halogen-containing surfactant, i.e. surfactant containing fluorine or chlorine as substituents on carbon atoms of the surfactant that are substituted with monovalent elements. Typically, at least 70% of these substitutions will be halogen atoms. When the halogen substituent is fluorine, the surfactant will typically be referred to as fluorosurfactant. The resulting dispersion of fluoropolymer particles is also essentially free of halogen-containing surfactant. If halogen-containing surfactant such as fluorosurfactant is present, then its amount should be small, i.e. no more than 50 ppm, and preferably no more than 40 or 30 ppm, and more preferably less than 20 ppm, preferably less than 10 ppm, and more preferably less than 5 ppm, These ppm are based on the weight of water present (added to) in the reactor upon completion of the polymerization. Solutions of ingredients added to the aqueous medium, such as initiator solution, are considered to be entirely of water in the calculation of solids content. Most preferably no halogen-containing surfactant, including fluorosurfactant, is added to the aqueous medium in the polymerization reactor.

The as-polymerized dispersion can be transferred to a dispersion concentration operation which produces concentrated dispersions stabilized typically with nonionic hydrocarbon surfactants by known methods. Hydrocarbon surfactant can be used for this purpose because the concentration of the dispersion in the aqueous medium is carried out after completion of the polymerization. Solids contents of concentrated dispersion is typically 35 to 70% by weight, more often 45 to 65 wt %. Example 8 discloses solids contents of 45 wt % and greater being obtained directly from polymerization when the fluoropolymer of the dispersion of particles in the aqueous medium is polytetrafluoroethylene, thereby not requiring any concentration step. Alternatively, for use as a molding resin, a fluoropolymer resin is isolated from the fluoropolymer dispersion usually by coagulation and the aqueous medium is removed. The fluoropolymer is dried then processed into a convenient form such as flake, chip or pellet for use in subsequent melt-processing operations. Certain grades of PTFE dispersion are made for the production of fine powder. For this use, the dispersion is coagulated, the aqueous medium is removed and the PTFE is dried to produce fine powder.

Polymerization Nucleation Sites

A preferred embodiment is to provide polymerization nucleation sites in the aqueous medium prior to kickoff (commencement) of the polymerization process, in order to reduce the size of the fluoropolymer particles forming the dispersion thereof in the aqueous medium as a result of the polymerization process. These nucleation sites form loci for the precipitation of fluoropolymer, the number of loci being greater than if no such sites were present, which can result in the smaller fluoropolymer particle size for a given percent solids. After this precipitation, the subsequent precipitation of fluoropolymer is preferably at the same loci, causing the polymer particles to grow, until the completion of the polymerization reaction.

One method of forming these polymerization sites is to start with already polymerized particles present in the aqueous polymerization medium prior to kickoff of the polymerization reaction. These already polymerized particles are often called polymer seeds. The seeds may be formed by free-radical initiated polymerization of fluoromonomer in the presence of surfactant so that the polymer seeds remain dispersed in the aqueous medium within which they are formed. The subsequent kickoff of the polymerization reaction in the aqueous medium wherein the dispersion of polymer seeds are already present involves adding new fluoromonomer, and new polymerization initiator to the reactor to cause the kickoff and subsequent polymerization.

The surfactant used to disperse the polymer seeds in the aqueous medium can be a halogen-containing surfactant, such as a fluorosurfactant, that has minimal-to-no telogenic activity, thereby not inhibiting the subsequent kickoff and polymerization reaction forming the fluoropolymer. This halogen-containing surfactant may be present due to its use during polymerization of the polymer seeds. Examples of fluorosurfactants are ammonium perfluorooctanoate, ammonium ω-hydrohexadecafluorononoate, and ammonium 3.6 dioxa-2,5-di(trifluoromethyl)undecafluorononoate as disclosed in U.S. Pat. No. 3,391,099. Examples of suitable fluoroether surfactants have been described in U.S. Pat. No. 3,271,341 to Garrison; U.S. patent publications 2007/0015864, 2007/0015865, and 2007/0015866 to Hintzer et al.; U.S. patent publications 2005/0090613 to Maruya et al. and 2006/0281946 to Morita et al.; PCT patent publications WO 2007046345 to Higuchi et al., 2007046377 to Funaki et al., 2007046482 to Hoshikawa et al., and 2007/049517 to Matsuoka et al. Additional fluorosurfactants are disclosed in U.S. Pat. No. 7,705,074 to Brothers et al., which are the combination of a fluoropolyether having a number average molecular weight of at least 800 g/mol and a short chain fluorosurfactant having the formula $$[R^1 - O_n - L - A^-]Y^+ \qquad (I)$$

wherein:
  $R^1$ is a linear or branched partially or fully fluorinated aliphatic group which may contain ether linkages;
  n is 0 or 1;
  L is a linear or branched alkylene group which may be nonfluorinated, partially fluorinated or fully fluorinated and which may contain ether linkages;

A⁻ is an anionic group selected from the group consisting of carboxylate, sulfonate, sulfonamide anion, and phosphonate; and Y⁺ is hydrogen, ammonium or alkali metal cation;

with the proviso that the chain length of R¹—O$_n$-L- is not greater than 6 atoms.

"Chain length" as used in this application refers to the number of atoms in the longest linear chain in the hydrophobic tail of the fluorosurfactant employed in the process of this invention. Chain length includes atoms such as oxygen atoms in addition to carbon in the chain of hydrophobic tail of the surfactant but does not include branches off of the longest linear chain or include atoms of the anionic group, e.g., does not include the carbon in carboxylate. "Short chain" as used in this application refers to a chain length of not greater than 6. "Long chain" refers to a chain length of greater than 6, e.g., fluorosurfactants having a chain length of 7 to 14 atoms.

Preferably, the chain length of R¹—O$_n$-L- is 3 to 6 atoms. In accordance with one preferred form of the invention the chain length of R¹—O$_n$-L- is 4 to 6 atoms. In accordance with another preferred form of the invention the chain length of R¹—O$_n$-L- is 3 to 5 atoms. Most preferably, the chain length of R¹—O$_n$-L- is 4 to 5 atoms.

The preferred short chain surfactant is the dimer acid of hexafluoropropylene epoxide, having the formula C₃F₇O—CF(CF₃)—COOH.

The perfluoropolyether (PFPE) acids or salts thereof can have any chain structure in which oxygen atoms in the backbone of the molecule are separated by saturated fluorocarbon groups having 1-3 carbon atoms. More than one type of fluorocarbon group may be present in the molecule. Representative structures have the repeat unit represented in the following formulas:

  (VII)

  (VIII)

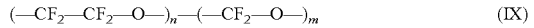  (IX)

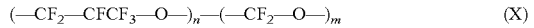  (X)

These structures are discussed by Kasai in J. Appl. Polymer Sci. 57, 797 (1995). As disclosed therein, such PFPE can have a carboxylic acid group or salt thereof at one end or at both ends. Similarly, such PFPE may have a sulfonic acid or phosphonic acid group or salt thereof at one end or both ends. In addition, PFPE with acid functionality at both ends may have a different group at each end. For monofunctional PFPE, the other end of the molecule is usually perfluorinated but may contain a hydrogen or chlorine atom. PFPE having an acid group at one or both ends for use in the present invention has at least 2 ether oxygens, preferably at least 4 ether oxygens, and even more preferably at least 6 ether oxygens. Preferably, at least one of the fluorocarbon groups separating ether oxygens, and more preferably at least two of such fluorocarbon groups, have 2 or 3 carbon atoms. Even more preferably, at least 50% of the fluorocarbon groups separating ether oxygens have 2 or 3 carbon atoms. Also, preferably, the PFPE has a total of at least 15 carbon atoms, e.g., the preferred minimum value of n or n+m in the above repeat unit structures is at least 5. More than one PFPE having an acid group at one or both ends can be used in a process in accordance with the invention. Typically, unless extraordinary care is employed to manufacture a single specific PFPE compound, the PFPE may contain multiple compounds in varying proportions within a molecular weight range the average molecular weight. The number average molecular weight of the fluoropolyether acid or salt preferably has a number average molecular weight of less than 6000 g/mol.

Because the seed polymer is small in particle size, e.g. 1 to 50 nm, only a small amount of halogen-containing surfactant, such as fluorosurfactant, is usually necessary to maintain the polymer seeds as a dispersion until kickoff of the subsequent polymerization reaction. This small amount can be the same as the amounts mentioned above with respect to the aqueous polymerization medium being essentially free of halogen-containing surfactant. This means that removal or recovery of the halogen-containing surfactant from the aqueous polymerization medium after completion of the polymerization to form the dispersion of fluoropolymer particles may not be necessary or, if desired, can be minimized.

Another Example of providing polymer as polymerization sites is disclosed in U.S. Patent Publication 2010/0160490 (Leffew et al.), wherein the polymerization sites are particles of fluorinated ionomer.

Preferably, polymerization sites are provided by oleophilic nucleation sites formed in the aqueous medium prior to kickoff of the polymerization. These oleophilic nucleation sites are dispersed in the aqueous medium, enabling the precipitation of fluoropolymer at these sites to be finely dispersed, such that the metering of the hydrocarbon stabilizing surfactant can be delayed without penalty in polymerization results. The oleophilic nucleation sites are preferably formed by the addition of small amounts of water-soluble hydrocarbon-containing compound, preferably hydrocarbon-containing surfactant, containing hydrophobic moiety and hydrophilic moiety, and degradation agent, preferably an oxidizing agent, to the aqueous medium prior to the kickoff of polymerization. The degradation agent, preferably oxidizing agent, subjects the hydrocarbon-containing compound to reaction that degrades the hydrophilic moiety, thereby enabling the hydrophobic moiety of the compound to become the oleophilic nucleation sites. Thus, the oleophilic nucleation sites comprise oleophilic moiety of water-soluble organic compound that will typically be a surfactant and contains oleophilic moiety and hydrophilic moiety, the latter having been degraded as mentioned above to result in the sites exhibiting their oleophilic character. These oleophilic nucleation sites dispersed in the aqueous medium are not polymer seeds. Thus, these sites, as formed, are preferably free of polymerized fluoromonomer.

The preferred oxidative degradation of the hydrophilic moiety of the hydrocarbon-containing compound, preferably hydrocarbon-containing surfactant, causes the compound to lose hydrophilicity and any surfactant effect. This provides the condition wherein the subsequent kickoff of the polymerization reaction is carried out essentially free of hydrocarbon-containing surfactant (and hydrocarbon surfactant). Accordingly, the dispersion of oleophilic nucleation sites are also essentially free of hydrocarbon-containing surfactant (and hydrocarbon surfactant). No surfactant is necessary for the maintenance of the oleophilic nucleation sites as a dispersion until subsequent kickoff of the polymerization reaction.

A small amount of hydrocarbon-containing surfactant can, however, be present with the dispersion of oleophilic nucleation sites, if not detrimental to the kickoff of the polymerization reaction. The amount that can be tolerated will depend on the surfactant.

In addition to the dispersion of oleophilic nucleation sites and the aqueous medium containing this dispersion being essentially free of hydrocarbon-containing surfactant, such as hydrocarbon surfactant, it is preferred that this dispersion and aqueous medium are also essentially free of halogen-containing surfactant, i.e. essentially free of all surfactant as described above.

The use of hydrocarbon-containing surfactant and especially hydrocarbon surfactant as the precursor for the oleophilic nucleation sites in the degradation or oxidation reaction prior to polymerization kickoff together with the use of hydrocarbon-containing stabilizing surfactant, especially hydrocarbon stabilizing surfactant, provides a halogen-free system in the aqueous polymerization medium for the creation of the nucleation sites and the stabilization of the fluoropolymer particle dispersion subsequently obtained.

The presence of the dispersion of oleophilic nucleation sites without the assistance of surfactant to maintain these sites dispersed is unexpected. This contradictory condition can be achieved, however, by how the sites are formed. The dispersion of oleophilic nucleation sites is preferably formed by degrading, preferably oxidizing, a water-soluble hydrocarbon-containing compound, preferably a hydrocarbon-containing surfactant, that contains hydrophilic moiety imparting water solubility to the compound and hydrophobic moiety. Thus, these sites are the product of the degradation, preferably oxidation, reaction. Prior to such degradation, the hydrophilic moiety of the compound cloaks the hydrophobic moiety with hydrophilicity, thereby allowing the compound to be water soluble. Degradation of the hydrophilicity of the compound, i.e. the hydrophilic moiety of the compound, is effective to enable the hydrophobic moiety of the hydrocarbon-containing compound to become the well dispersed oleophilic nucleation sites. Thus, these sites are hydrocarbon-containing and therefore may also be called hydrocarbon-containing nucleation sites. If hydrocarbon compound or surfactant is the precursor to the nucleation sites, then they are hydrocarbon nucleation sites. These sites are accessible to and have an affinity for the precipitation of fluoromonomer as fluoropolymer formed at the kicking off of the polymerization process. This affinity is an attraction of the nucleation sites for the precipitating fluoropolymer. The preferred precursor to the nucleation sites is hydrocarbon surfactant and the preferred nucleation sites are the hydrocarbon nucleation sites That the nucleation sites do not flocculate upon the degradation of the hydrophilicity of the compound is a result of the oleophilic nucleation sites being derived from an organic compound (surfactant) that is soluble in the aqueous medium. The distribution of the dissolved hydrocarbon-containing surfactant is on a molecular basis within the aqueous medium. The oleophilic nucleation sites obtained from the surfactant enjoy this same distribution, thereby not requiring surfactant to maintain the dispersion of oleophilic nucleation sites.

To distinguish the hydrocarbon-containing stabilizing surfactant from the hydrocarbon-containing surfactant or hydrocarbon surfactant preferably used as a precursor to the dispersion of oleophilic nucleation sites, the precursor surfactant can be referred to as the nucleant surfactant The performance of the nucleation sites is judged primarily by the small particle size of the fluoropolymer particles as compared to conducting the polymerization reaction without these nucleation sites being present. This performance indicates the presence of a dispersion of nucleation sites at the time of polymerization kickoff.

To obtain the pre-kick off condition of the dispersion of oleophilic nucleation sites and the aqueous polymerization medium being essentially free of hydrocarbon-containing surfactant and preferably any other surfactant from the dispersion, preferably only a small amount (weight) of the hydrocarbon-containing surfactant as the nucleant surfactant is used as the nucleation site precursor, e.g. no more than 50 ppm. All ppm amounts disclosed herein with respect to the formation of the dispersion of oleophilic nucleation sites refer to the amount of water present at the time of this event. Solutions of ingredients added to the aqueous medium, such as nucleant surfactant solution, are considered to be entirely of water in the calculation of ppm. The amount of water present upon the formation of the oleophilic nucleation sites does not include after-added water such as in the form of the aqueous solutions of polymerization initiator added to cause polymerization kickoff, passivated hydrocarbon-containing stabilizing surfactant used to stabilize the fluoropolymer particles formed after kickoff, and passivation adjuvant. The combination of a small amount of nucleant surfactant together with the oxidative degradation of the hydrophilicity thereof provides the reduction or elimination of telogenicity.

The small amount of nucleant surfactant added to the aqueous medium to form the oleophilic nucleation sites is preferably no greater than 40 ppm, even more preferably, no greater than 30 ppm, and most preferably no greater than 20 ppm, all based on the weight of water in the aqueous medium present at the formation of the nucleation sites as described in the preceding paragraph. The ppm amounts of oleophilic nucleating sites present in the aqueous medium would be less than the ppm amounts disclosed herein as being added to the aqueous medium by virtue of the degradation or oxidation reaction degrading the hydrophilic moiety. Thus, the amount of nucleation sites would be less than the 50 ppm, 40 ppm, 30 ppm, and 20 ppm amounts, respectively, mentioned above. Since it is believed that nucleation sites exist as molecules, only a small amount of the hydrocarbon-containing compound, preferably the nucleant surfactant can produce a large amount of oleophilic nucleation sites. Thus, addition of as little as 1 ppm of such compound or surfactant to the aqueous medium can provide beneficial effect. The foregoing amounts apply to the use of hydrocarbon-containing surfactant and hydrocarbon surfactant as nucleant surfactants and precursors in the oxidation reaction and to the resultant hydrocarbon-containing and hydrocarbon oleophilic nucleation sites as well. The nucleant surfactants can be used individually or in combination.

The nucleant surfactants used as precursor to the formation of the dispersion of oleophilic nucleation sites can be any of the surfactants disclosed above with respect to the hydrocarbon-containing stabilizing surfactant. Additional hydrocarbon-containing surfactants include the nonionic and cationic surfactants, including the siloxane surfactants such as disclosed in U.S. Pat. No. 7,897,682 (Brothers et al.) and U.S. Pat. No. 7,977,438 (Brothers et al.).

The preferred nucleant surfactants are the nonionic surfactants, especially the nonionic hydrocarbon surfactants. Accordingly, in the process of the present invention, when the above-described nucleation site forming step is used, the nucleant surfactant is preferably nonionic hydrocarbon surfactant, and the hydrocarbon stabilizing surfactant is preferably anionic. The nucleant surfactant is also preferably free of aromatic moiety.

Nonionic hydrocarbon nucleant surfactants include polyoxyethylene alkyl ethers, polyoxyethylene alkyl phenyl ethers, polyoxyethylene alkyl esters, sorbitan alkyl esters, polyoxyethylene sorbitan alkyl esters, glycerol esters, their derivatives and the like. More specifically examples of polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether and the like; examples of polyoxyethylene alkyl phenyl ethers are polyoxyethylene nonyl phenyl ether, polyoxyethylene octyl phenyl ether and the like; examples of polyoxyethylene alkyl esters are polyethylene glycol monolaurylate, polyethylene glycol monooleate, polyethylene glycol monostearate and the like; examples of sorbitan alkyl esters are polyoxyethylene sorbitan monolaurylate, polyoxyethylene sorbitan monopalmitate, polyoxyethylene sorbitan monostearate, polyoxyethylene sorbitan monooleate and the like; examples of polyoxyethylene sorbitan alkyl esters are polyoxyethylene sorbitan monolaurylate, polyoxyethylene sorbitan monopalmitate, polyoxyethylene sorbitan monostearate and the like; and examples of glycerol esters are glycerol monomyristate, glycerol monostearate, glycerol monooleate and the like. Also examples of their derivatives are polyoxyethylene alkyl amine, polyoxyethylene alkyl phenyl-formaldehyde condensate, polyoxyethylene alkyl ether phosphate and the like. Particularly preferable are polyoxyethylene alkyl ethers and polyoxyethylene alkyl esters. Examples of such ethers and esters are those that have an HLB value of 10 to 18. More particularly there are polyoxyethylene lauryl ether (EO: 5 to 20. EO stands for an ethylene oxide unit.), polyethylene glycol monostearate (EO: 10 to 55) and polyethylene glycol monooleate (EO: 6 to 10).

Suitable nonionic hydrocarbon nucleant surfactants include octyl phenol ethoxylates such as the Triton® X series supplied by Dow Chemical Company:

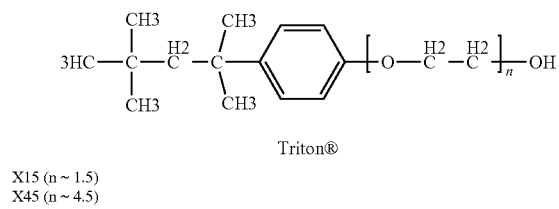

Triton®

X15 (n ~ 1.5)
X45 (n ~ 4.5)

Preferred nonionic hydrocarbon nucleant surfactants are branched alcohol ethoxylates such as the Tergitol® 15-S series supplied by Dow Chemical Company and branched secondary alcohol ethoxylates such as the Tergitol® TMN series also supplied by Dow Chemical Company.:

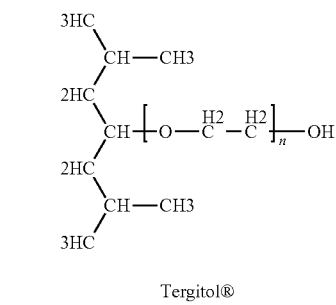

Tergitol®

TMN-6 (n ~ 8)
TMN-10 (n ~ 11)
TMN-100 (n ~ 10)

Ethyleneoxide/propylene oxide copolymers such as the Tergitol® L series surfactant supplied by Dow Chemical Company are also useful as nonionic nucleant surfactants in this invention.

Yet another useful group of suitable nonionic hydrocarbon nucleant surfactants are difunctional block copolymers supplied as Pluronic® R series from BASF, such as:

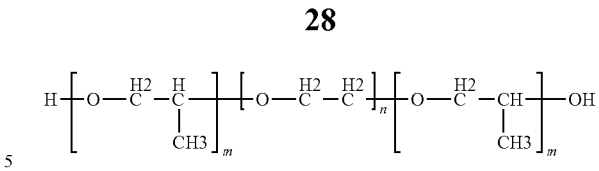

Pluronic® R

31R1 (m ~ 26, n ~ 8)
17R2 (m ~ 14, n ~ 9)
10R5 (m ~ 8, n ~ 22)
25R4 (m ~ 22, n ~ 23)

Another group of suitable nonionic hydrocarbon nucleant surfactants are tridecyl alcohol alkoxylates supplied as Iconol® TDA series from BASF Corporation.

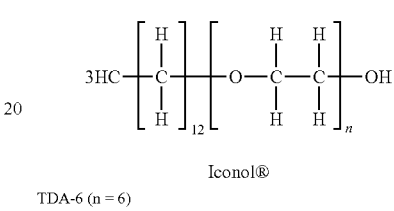

Iconol®

TDA-6 (n = 6)
TDA-9 (n = 9)
TDA-10 (n = 10)

Cationic surfactants can also be used as nucleant surfactants. A typical cationic surfactant has a positively charged hydrophilic portion such as an alkylated ammonium halide, such as alkylated ammonium bromide, and a hydrophobic portion such as a long chain fatty acid. An anionic surfactant has a negatively charged hydrophilic portion such as a carboxylate, sulfonate, or sulfate salt and a long chain hydrocarbon portion, such as alkyl, as the hydrophobic portion.

Another group of nucleant surfactants that can be used are the hydrocarbon-containing siloxane surfactants, preferably the hydrocarbon surfactants wherein the hydrocarbyl groups as described above, are entirely substituted with hydrogen atoms where they could be substituted by halogen such as fluorine, whereby these siloxane surfactants can also be considered as hydrocarbon surfactants, i.e. the monovalent substituents on the hydrocarbyl groups are hydrogen. Preferred as nucleant surfactants are the hydrocarbon siloxanes that have nonionic moieties, i.e., the nonionic hydrocarbon (siloxane) surfactants.

The degradation agent used as the oxidizing agent for the hydrocarbon-containing compound, preferably nucleant surfactant, in the preferred embodiment to form the oleophilic nucleation sites is preferably a water-soluble polymerization initiator that is also useful for the polymerization of fluoromonomer. Such polymerization initiators are not known to be harmful to the polymerization of fluoromonomers when used in the proper amount, whereby their introduction into the aqueous medium to cause the oxidation of the hydrocarbon-containing compound or nucleant surfactant should not cause any problem in the subsequent polymerization reaction. Moreover, the amount of initiator used as the degradation agent is preferably small, yet effective to result in the desired oxidation of the nucleant surfactant to form the dispersion of oleophilic nucleation sites. The amount of initiator added to the aqueous polymerization medium is preferably insufficient to cause kickoff of the subsequent polymerization reaction. The amount of initiator remaining in the aqueous medium after oxidation of the nucleant surfactant to form the dispersion of oleophilic nucleation sites is preferably also insufficient to cause kickoff of the polymerization reaction. This avoids polymerization occurring during the initial pressuring up of the polymerization reactor with fluoromonomer, after which kickoff of the polymerization reaction occurs when additional water-soluble free-radical polymerization is added to the aqueous medium.

Additional free radical polymerization initiator is added to the aqueous medium in the pressured-up reactor to provide kickoff of the polymerization reaction. When oleophilic nucleation sites are employed, this would be the second addition of polymerization initiator to the aqueous polymerization medium.

Examples of polymerization initiators that can be used as the degradation agent in the oleophilic nucleation forming step are those that will rapidly oxidize the nucleant surfactant at the temperature of the aqueous medium achievable within the polymerization reactor to form the desired oleophilic nucleation sites. Rapid reaction is desired so that the resultant oleophilic nucleation sites, now existing in the aqueous medium that is essentially free of surfactant, can be available for the polymerization reaction as a dispersion. Preferred initiators for this purpose are the highly active water-soluble salts of inorganic initiators such as the inorganic peracids. Preferred initiators are the persulfate salts, e.g., ammonium persulfate or potassium persulfate. Preferred persulfate initiators are substantially free of metal ions and most preferably are ammonium salts. Additional initiators useful in the practice of this invention are water-soluble organic azo compounds such as azoamidine compounds.

The amount of degradation agent, preferably polymerization initiator, added to the aqueous medium will depend on the molecular weight of the initiator used that contains the oxidation moiety, preferably the peroxy —O—O— group. Too much degradation agent, preferably initiator, used in the nucleation site forming step may cause destabilization of the nucleation sites along with premature polymerization of fluoromonomer pressuring up the reactor to kick off, resulting in larger fluoropolymer particles being formed in the polymerization step. The amount of degradation agent, preferably initiator, is preferably less than the amount required to kickoff the polymerization reaction before it reaches operating pressure, preferably no greater than 50 ppm, more preferably non greater than 40 ppm, more preferably no greater than 30 ppm, even more preferably no greater than 20 ppm, and most preferably no greater than 15 ppm, or no greater than 10 ppm, or no greater than 5 ppm, all based on the weight of the water in the reactor at the time of the nucleation site forming step. The minimum amount of degradation agent, preferably initiator, added to the aqueous medium can be as little as 1 ppm. Solutions of ingredients added to the aqueous medium, such as nucleant surfactant solution, are considered to be entirely of water in the calculation of ppm. The ppm amount of degradation agent, preferably initiator, present in the aqueous medium after formation of the dispersion of nucleation sites will be less than the ppm amounts disclosed herein as being added to the aqueous medium by virtue of the oxidation reaction causing degradation of water soluble hydrocarbon-containing compound.

A preferred embodiment of forming polymerization sites is wherein the oleophilic nucleation sites are either hydrocarbon containing or hydrocarbon oleophilic nucleation sites, which are made by adding hydrocarbon-containing compound, which is preferably a surfactant, or hydrocarbon surfactant as the nucleant surfactant, respectively, each containing hydrophobic moiety and hydrophilic moiety, to the aqueous polymerization medium and exposing the compound or surfactant to degradation, preferably oxidation in the aqueous medium to degrade the hydrophilic moiety, thereby enabling the hydrophobic moiety to form the dispersion of hydrocarbon-containing, preferably hydrocarbon, oleophilic nucleation sites. This nucleation site forming step is carried out prior to kickoff of the polymerization reaction according to the preferred polymerization process of the present invention.

Preferably the amount of the nucleant surfactant added to the aqueous medium is no greater than 50 ppm, and such amount can be any of the lesser amounts mentioned above, selected so as not to be detrimental to the subsequent polymerization reaction.

Preferably, this degradation of the nucleant surfactant is carried out by adding degradation agent to the aqueous medium and reacting the degradation agent with the nucleant surfactant in the aqueous medium, the amount of degradation agent being insufficient to cause the kickoff of the polymerizing of the fluoromonomer. Preferably, the degradation agent is free radical polymerization initiator and the amount of degradation agent or initiator is no greater than 50 ppm.

Preferably, the formation of the dispersion of oleophilic nucleation sites as described above is accompanied by the additional step adding water-soluble inorganic salt to the aqueous medium prior to the exposure of the nucleant surfactant to the degradation. At the time of the degradation, water-soluble inorganic salt is also present in the aqueous medium to aid the formation of the dispersion of oleophilic nucleation sites.

The effect of the water-soluble inorganic salt is to either (a) increase the number of oleophilic nucleation sites, thereby resulting in smaller fluoropolymer particles and/or (b) enable the amount of oleophilic nucleation sites formed from nucleant surfactant to be reduced for a given particle size. With respect to (a), this decrease in fluoropolymer particle size is with respect to a given small amount of nucleant surfactant present in the degradation reaction. With respect to (b), this enables a smaller amount of nucleant surfactant to be present in the oxidation reaction, thereby reducing the possibility for the product of the oxidation reaction from being telogenic in the subsequent polymerization reaction. The presence of the ions derived from the salt in aqueous solution provide the beneficial effect.

Examples of water-soluble inorganic salts that can act to aid in the nucleation site forming process include those containing alkali metal cations selected from Na and K or $NH_4^+$ and anions selected from $-SO_3^-$, $-HSO_3^-$, $-NO_3^-$, $-CL^-$, $-CO_3^-$, $B_4O_7^-$, and $-HPO_4^-$. When the fluoropolymer being made by polymerization is to be fabricated by melt extrusion, the salt is preferably an ammonium salt.

The salt is selected such that it is effective to provide the beneficial effect (a) or (b) mentioned above and neither deactivates the degradation agent, preferably initiator, thereby preventing the degradation reaction from occurring, nor reacts with the initiator to prevent the initiator from reacting with the nucleant surfactant, nor inhibits the eventual polymerization. This enables a smaller amount of nucleant surfactant to be used for forming the oleophilic nucleation sites than if no salt were used. This is especially important in the polymerization process for making the highest molecular weight fluoropolymer, PTFE. The salt may be a reducing agent, but is not necessarily so. The carrying out of the oxidation reaction between the water soluble hydrocarbon-containing compound, preferably nucleant surfactant, and the degradation agent, preferably initiator, in the presence of the water-soluble inorganic salt includes the possibility that the salt undergoes some transformation, such as a oxidation/reduction reaction, as well. It is apparent that the ionization of the salt in the aqueous medium has a positive affect on the formation of nucleation sites. If the amount of salt is too large, however, the result can be negative, i.e. a reduced number of nucleation sites and an increased fluoropolymer particle size. The amount of this water-soluble inorganic salt to be added to the aqueous medium is that which is effective to provide beneficial result. This amount is also small so as not to adversely effect the performance of the oleophilic nucleation sites or the subsequent polymerization reaction. The amount when this conversion of positive effect to negative effect depends primarily on the salt used, but generally this conversion occurs at greater than 125 ppm salt, based on the weight of water in the reactor at the time of forming the nucleation sites.

Generally to provide benefit to the nucleation site forming process and not be detrimental either to it or subsequent polymerization of the fluoromonomer, the amount of water-soluble inorganic salt present in the aqueous medium at the time of the oxidation reaction, is preferably no greater than 100 ppm, preferably no greater than 75 ppm, even more preferably no greater than 50 ppm, and most preferably, no greater than 25 ppm, and preferably at least 1 ppm. Solutions of ingredients added to the aqueous medium, such as nucleant surfactant solution, are considered to be entirely of water in the calculation of ppm.

In the oleophilic nucleation site-forming process implemented prior to polymerization kickoff, each of these amounts of water soluble hydrocarbon-containing compound, preferably nucleant surfactant, water-soluble inorganic salt, and degradation agent, preferably initiator, mentioned above can be used in any combination of the amounts mentioned.

It is also preferred that essentially no reactive fluoromonomer be present in the reactor at least at the commencement of the nucleation site forming step and the concomitant formation of the dispersion of oleophilic nucleation sites, i.e. the formation of these sites is preferably in the absence of fluoromonomer that may preferentially react with the small amount of initiator used as the degradation agent.

In a typical process for forming the dispersion of oleophilic nucleation sites, the reactor is charged with deionized and deaerated water. The oleophilic nucleation sites can conveniently be formed in-situ within this aqueous medium charged to the reactor by adding water soluble hydrocarbon-containing compound, preferably nucleant surfactant, to the aqueous charge in the small amount desired. Preferably, water-soluble inorganic salt is also added to this aqueous charge and these two compounds are mixed together. The nucleant surfactant can conveniently be converted to the oleophilic nucleation sites by degrading the hydrocarbon-containing compound, preferably nucleant surfactant, in the aqueous medium in the reactor and in the presence of the water-soluble salt. The degradation agent can conveniently be the small amount of water-soluble polymerization initiator added to the aqueous medium. The temperature of the aqueous medium will be at the temperature effective to cause the oxidation reaction to occur and will generally be from 25 to 120° C., preferably 40 to 120° C., more preferably from 50 to 120° C. and even more preferably from 60 to 120° C., most preferably 70 to 120° C., and same temperature can be the same or similar temperature at which the subsequent polymerization is carried out. The temperature used will primarily depend on the temperature desired for the later polymerization step, which temperature will also be high enough for the degradation agent or initiator to become oxidatively reactive with respect to the hydrocarbon-containing compound, preferably nucleant surfactant. The oxidation reaction is preferably carried out sufficiently to degrade the hydrophilic moiety of the hydrocarbon-containing compound or nucleant surfactant to enable the residue of the oxidized compound to become oleophilic nucleation sites. The oleophilic nucleation sites although oleophilic are invisible in the aqueous medium. The formation of the dispersion of nucleation sites commences with the start of the oxidation reaction. It is contemplated that this reaction may continue as the reactor is pressured up with fluoromonomer added to the reactor to achieve the reactor pressure desired for kickoff. Thereafter, the polymerization step of the process of the present invention is carried out, involving pressuring up the reactor with the fluoromonomer to be polymerized, followed by initiator-initiated kickoff of the polymerization reaction, preferably essentially in the absence of hydrocarbon-containing surfactant and delayed addition of hydrocarbon-containing stabilizing surfactant, and addition of the stabilizing surfactant, passivated within the polymerization reactor or outside of the reactor as described above.

The passivation adjuvant, such as metal ion, added to catalyze the passivation reaction between the stabilizing surfactant and the oxidizing agent to reduce telogenic behavior of the stabilizing surfactant differs from the salt used in the formation of the oleophilic nucleation sites. The salt positively affects oleophilic nucleation site formation. The salt containing the metal ion as the passivation adjuvant, if added to the water at the beginning of the batch, negatively affects nucleation site formation, whereby it is preferred that addition of this passivation adjuvant, preferably metal ion, to the aqueous medium be delayed at least until after the commencement of the formation of the oleophilic nucleation sites and more preferably after commencement of the polymerization reaction. The same precaution is preferred when the nucleation sites are formed by seed polymerization.

EXAMPLES

Melt flow rate (MFR) is determined using the procedure of ASTM D 1228 and melt temperature and plastometer piston weight conditions, usually 5 kg, that are standard for the polymer as indicated in the ASTM procedure for the particular polymer.

Melting temperature is measured by Differential Scanning calorimeter (DSC) according to the procedure of ASTM D 4591. The PTFE DSC melting temperature is obtained from the first time the polymer is heated above the melting temperature, also referred to as the first heat, in accordance with ASTM D-4591-87. The melting temperature reported is the peak temperature of the endotherm on first melting.

The definition (calculation) of ppm herein is the weight of the ingredient divided by the weight of water present in the reactor at the time of the event when the concentration in ppm is being determined. Ppm of nucleant surfactant, salt, if any, and initiator in the precharge composition to the polymerization reactor is based on the weight of water initially charged to the reactor and any additional water charged containing each of the nucleant surfactant, salt, if present, and initiator ingredients. Thus, the amount of water present in the reactor at the time of forming the oleophilic nucleation sites is the weight of water on which the ppm of the nucleant surfactant, salt, if any, and initiator is determined. This amount will not include water added as solvent for the initiator added to the aqueous medium to provide for kickoff of the polymerization reaction or for addition of stabilizing surfactant to the aqueous medium. This amount of added water would be included in the ppm calculation of any surfactant present in the aqueous medium at the time of polymerization kickoff. For simplicity, when the water added to the reactor contains a dissolved ingredient, such as nucleant surfactant, salt, polymerization initiator, the resultant solution is considered to be entirely of water for purposes of ppm calculation. An expressed exception to this way of determining ppm is the determination of the concentration of stabilizing surfactant based on the total amount of fluoropolymer particles present in the dispersion upon completion of the polymerization reaction, as described in EXAMPLE 8.

The disclosure of numerical amounts as "no greater than" and the like herein has the same meaning as the same numerical amounts being designated as being particular amounts or less. Thus, no greater than 50 ppm has the same meaning as 50 ppm or less. Similarly, the disclosure of numerical amounts of "at least" and the like herein has the same meaning as the same numerical amounts being designated as being particular amounts or greater. Thus, at least 45 wt % has the same meaning as 45 wt % or greater.

The reactor pressures disclosed herein are absolute pressures unless otherwise indicated as being gauge pressures (psig). The MPa and KPa pressures disclosed as corresponding to the psig gauge pressures are absolute pressures.

The general polymerization procedure used in the Examples is as follows unless otherwise indicated:

To a 12 liter, horizontally disposed, jacketed, stainless steel reactor with a two blade agitator is added 5200 gm of deionized, deaerated water and 250 gm of liquid wax. To the reactor is added an additional 500 gm of deionized, deaerated water which contains 0.085 gm of Pluronic® 31R1, and 0.4 gm of sodium sulfite. The reactor is sealed and placed under vacuum. The reactor pressure is raised to 30 psig (310 kPa) with nitrogen and brought to vacuum 3 times. The agitator speed is set to 65 RPM and the reactor is heated to 90° C. 80 ml of a solution containing 0.5 gm of ammonium persulfate (APS) initiator per liter of water is added to the reactor, providing an APS concentration in the water added so far to the reactor of 6.9 ppm. At this stage the concentration of Pluronic®31R1 is 14.7 ppm and that of the sodium sulfite is 6.9 ppm. This is the stage of the reaction wherein oleophilic nucleation sites are formed prior to kickoff of the polymerization reaction. The ppm of ingredients added to the aqueous medium stated above are based on the total amount of water present in the reactor up until this time. Solutions of ingredients are considered to consist entirely of water in this ppm calculation.

TFE is next charged to the reactor to bring the reactor pressure to 400 psig (2.86 MPa). 150 ml of an initiator solution composed of 11.67 gm of (70% active) disuccinic acid peroxide, 0.17 gm of ammonium persulfate and 488.3 gm of deionized water is charged to the reactor at 80 ml/min. Kickoff of the polymerization reaction is considered to have occurred after a drop of 10 psi (69 kPa) from the maximum pressure observed during injection of the initiator solution. Reactor pressure is brought back to 400 psig (2.86 MPa) with makeup TFE and maintained at that pressure for the duration of the polymerization by continuous addition of makeup TFE. After 100 gm of TFE has been fed since kickoff corresponding to a 1.68 wt % PTFE concentration in the aqueous medium, surfactant solution with or without metal ions is pumped to the reactor at a rate of 4 ml/min (0.288 g/l-hr of metal ion) until the end of the run, i.e. until the addition of makeup TFE to the reactor is stopped. After the prescribed amount of makeup TFE has been added to the reactor, the agitator is stopped, this establishing the completion of the polymerization reaction. After venting of the reactor (removal of unreacted TFE), the polymer dispersion is discharged. Upon cooling, liquid wax is separated from the dispersion and the dispersion is filtered to remove undispersed solids. The reactor is opened and all adhered polymer removed from the reactor. Reactor cleanout is combined with the filtered solids and dried in a vacuum oven.

Coagulum (total undispersed solids) is obtained by further removing liquid wax from the dry filtered solids plus adhered polymer by centrifuging and blotting the polymer to remove wax. Wt % coagulum=[wt of coagulum/total polymer produced]×100 where total polymer produced is the combined weight of the coagulum and the dispersed fluoropolymer particles. All weights are measure of dry polymer.

The polymer dispersion is coagulated by diluting the dispersion water to about 10 wt % solids and adding aqueous ammonium carbonate solution followed by vigorous agitation until the polymer fully separates from the water. The resultant polymer is dried in a vacuum oven at 110° C. for 12 hours. Melting point and heat of fusion of this polymer is determined by Differential Scanning calorimeter (DSC). The polymer is PTFE having a molecular weight (Mn) of at least 1,000,000. The particle size of the dispersed polymer is determined by laser light scattering, as follows: Particle size of the raw dispersion of fluoropolymer particles in this and the other Examples herein is measured using laser light scattering with a Zetasizer Nano-ZS manufactured by Malvern Instruments. Samples for analysis are prepared in 10×10×45 mm polystyrene cuvettes, capped and placed in the device for analysis. Preparation of the sample is as follows. Water used to flush the cuvette and used to dilute the dispersion sample is rendered substantially free of particles by drawing deionized, deaerated water into a 10 cc glass hypodermic syringe with locking tip. A Whatman 0.02 micron filter (Cat. No. 6809-2002) is fitted to the locking tip of the syringe and pressure is applied force water through the filter and into the cuvette. Approximately 1.5 ml of water is placed in the cuvette, the cuvette is capped, shaken and uncapped. Water is poured out of the cuvette thus assuring the cuvette is free of particles. Approximately 2.5 gm of filtered water is placed in the cuvette. One drop of the fluoropolymer dispersion to be analyzed is added to the cuvette. The cuvette is capped and shaken to completely mix the fluoropolymer particles in the water. The sample is placed in the Nano-ZS for determination of Dv(50). Dv(50) is the median particle size based on volumetric particle size distribution, i.e. the particle size below which 50% of the volume of the population resides.

To provide a basis for comparing the particle sizes reported in the Examples, Dv(50) of 198 nm for PTFE polymerized to a % solids of 11.75 is extrapolated to a Dv(50) particle size of 311 nm at a % solids of 34% by the following equation:

$$D2=[P2\times(D1)^3/P1]^{1/3}$$

wherein P1 is the actual amount of polymer produced (in grams) having the Dv(50) particle size D1 (in nanometers); P2 equals the projected polymer produced in grams, and D2 is the projected particle size (in nanometers) of the P2 polymer. The 311 nm particle size is too large in the sense that it tends to cause excessive coagulum. A preferred Dv(50) particle size for the same % solids is less than 198 nm, e.g. 113 nm. This extrapolates to a Dv(50) of 176 nm using the above equation as follows:

$$D2=(3200\times113^3/849)^{1/3}=(5438481.04)^{1/3}=176\,nm$$

Example 1

This Example compares the polymerization process carried out with and without the presence of metal ion as passivation adjuvant, $Fe^{+2}$ provided by iron(II) sulfate, $FeSO_4.7H_2O$, together with hydrocarbon surfactant.

TABLE 1

| Exp. # | Surfactant Pumped | | | Metal ion Pumped | | | Batch Time min |
|---|---|---|---|---|---|---|---|
| | ml | ppm on water | Salt | ppm cation on water | wt % cation on surfactant | | |
| 1 comparison | 637 | 1396 | None | 0 | 0 | | 165.0 |
| 2 | 180 | 424 | FeSO$_4$—7H2O | 2.6 | 0.6032 | | 51.2 |

| Exp. # | Dispersion | | | STY |
|---|---|---|---|---|
| | % Solids | Dv (50) nm | Coag. % | gm/(L-hr) |
| 1-comparison | 17.60 | 144 | 1.14 | 43.49 |
| 2 | 17.94 | 150 | 1.12 | 132.80 |

The total amount of make-up TFE added to the reactor in Experiments 1 and 2 is 1250 g in each experiment. The surfactant in these Experiments is sodium dodecyl sulfate (SDS) as described above. The surfactant is added to the aqueous medium in the reactor as an aqueous solution also containing the metal ions in the salt mentioned in Table 1. The stock solution containing the SDS and salt (Experiment 2) contains 1.439 g of the SDS and 0.0432 g of the salt/100 g of water. The stock solution for Experiment 1 contains only the SDS in the same amount as for Experiment 2.

With respect to the column headings in Table 1, the "ppm on water" of surfactant is the total weight of surfactant added in the total weight of water added to the polymerization reactor until completion of the polymerization. The "ppm cation on water" is the weight ppm of the Fe$^{+2}$ in the total amount of water added to the reactor during the entire process (nucleation site formation plus polymerization), i.e. until completion of the polymerization reaction. The "wt % cation on surfactant" is based on the total weight of the metal ion as compared to the total weight of the surfactant in the solution added to the aqueous medium during polymerization. The batch time is measured as the time from kickoff to the end of makeup TFE addition accompanied by discontinuance of agitation (completion of the polymerization reaction). The "Dispersion % solids" is the wt % of the polymer particles dispersed in the aqueous medium, based on the sum of the total weight of the dispersed polymer particles+total weight of water present at completion of the polymerization reaction. "Wt % coagulum" is [wt of coagulum/total polymer produced]×100 where the total polymer produced is the combined weight of the coagulum and the dispersed fluoropolymer particles. All weights are measure of dry polymer.

STY has the meaning described above. These explanations of column headings apply to the same column headings in other Tables in the Examples that follow.

Experiment 1 shows that the unpassivated SDS by itself produces a small particle size with respect to the % dispersion solids and a small % coagulum, but at the expense of a long batch time and the expected relatively low STY. When the Fe$^{+2}$ cation is present with the SDS during the polymerization reaction, the batch time is only about ⅓ of that of Experiment 1 and the STY is increased by about 300%. The Fe$^{+2}$ cation also increases the effectiveness of the SDS surfactant by enabling the formation of about the same amount of % solids and coagulum with the use of much less SDS. The DSC melting temperature of the PTFE formed in this Example is 334.69° C. and 334.01° C. for Experiments 1 and 2, respectively. The heat of fusions of the PTFE for Experiment 1 are 75.65 J/gm (first heat) and 38.43 J/Gm (second heat). For Experiment 2, the heats of fusions are 74.36 J/gm (first heat) and 41.73 J/gm (second heat).

Example 2

The Example compares polymerization results using SDS as the stabilizing surfactant and different amounts of metal cation as passivation adjuvant added with the SDS as reported in Table 2. The metal cation is Fe$^{+2}$ provided by iron(II) sulfate, FeSO$_4$.7H$_2$O.

TABLE 2

| Exp. # | Surfactant | | Surfactant Sol'n Pumped | | | Batch Time min |
|---|---|---|---|---|---|---|
| | Sol'n Concentration SDS gm/L | Salt gm/L | SDS ppm on water | ppm cation on water | wt % cation on SDS | |
| 3 | 14.39 | 0.216 | 447 | 1.3 | 0.3015 | 53.4 |
| 4 | 14.39 | 0.432 | 405 | 2.4 | 0.6026 | 50.0 |
| 5 | 14.39 | 0.648 | 371 | 3.4 | 0.9046 | 46.4 |

| Exp. # | Dispersion | | | STY |
|---|---|---|---|---|
| | % Solids | Dv (50) nm | Coag. % | gm/(L-hr) |
| 3 | 16.26 | 138 | 0.74 | 111.46 |
| 4 | 16.35 | 122 | 0.33 | 120.50 |
| 5 | 16.63 | 131 | 0.68 | 130.51 |

The "Surfactant Sol'n Concentration" is the SDS and FeSO$_4$.7H$_2$O concentrations of the solution feed to the reactor. The "Salt gm/L" is the concentration of the salt, i.e. its total weight that includes the weight of the metal cation. This meaning is applicable to the same column heading in Tables that follow. The total amount of TFE makeup TFE is 1000 g. The polymerization of Experiment 4 produces the best result in terms of the combination of smallest PTFE particle size, smallest amount of % coagulum and a high STY. The melting temperatures (first heat) of the PTFE produced in these Experiment all exceed 332° C. and the decreases in heat of fusion from the first heat to the second heat melting all exceed 27 J/gm.

Example 3

This Example carries out the polymerizations of Example 1 but to the use of a greater amounts of makeup TFE to produce higher %s solids. Experiments 6 and 7 employ 2200 g makeup TFE and Experiment 8 employs 3100 g makeup TFE. As in Example 1, the stabilizing surfactant is SDS and the metal cation is either Fe$^{+2}$ provided as FeSO$_4$.7H$_2$O or Cu$^{+2}$ provided by copper(II) sulfate, CuSO$_4$.5H$_2$O. The results are reported in Table 3.

TABLE 3

| | Surfactant | | Surfactant Solution Pumped | | | |
|---|---|---|---|---|---|---|
| Exp. # | Sol'n Concentration SDS gm/L | Salt gm/L | SDS ppm on water | SALT | gm SALT | ppm cat. on water | wt % cation on SDS |
| 6 | 14.4 | 0.432 | 627 | FeSO₄•7H2O | 0.1166 | 3.8 | 0.6032 |
| 7 | 14.6 | 0.388 | 659 | CuSO₄•5H2O | 0.1086 | 4.5 | 0.6751 |
| 8 | 14.4 | 0.432 | 932 | FeSO₄•7H2O | 0.1773 | 5.6 | 0.6026 |

| | TFE | Batch | Dispersion | | | STY |
|---|---|---|---|---|---|---|
| Exp. # | Fed gm | Time min | % Solids | Dv (50) nm | Coag. % | gm/(L-hr) |
| 6 | 2200 | 72.9 | 27.48 | 183 | 1.66 | 162.8 |
| 7 | 2200 | 76.4 | 26.99 | 161 | 0.17 | 150.4 |
| 8 | 3100 | 111.7 | 34.28 | 195 | 1.22 | 148.0 |

All of these polymerizations produce high % solids, accompanied by small particle size relative to this high % solids, together with relatively low % coagulum and high STY as compared to Comparison Experiment 1. The melting temperatures of the PTFEs formed in these Experiments exceed 335° C. and the reductions in heat of fusion from the first heat to the second heat melting exceed 25 J/gm. The PTFE of Experiment 7 has a melting temperature (first heat) of 336.76° C., an SSG (standard specific gravity) of 2.212, which corresponds to a molecular weight (Mn) of 2,700,000, determined in accordance with the equation described by R. C. Doban et al., "Formula from molecular weight of Polytetrafluoroethylene", ASC Meeting, Atlantic City, N.J. September 1956 (also published at p. 15 of WO2009/013214).

Example 4

This Example compares polymerization results using different metal ions as passivation adjuvant added with the SDS stabilizing surfactant solution. The results are reported in Table 4.

TABLE 4

| | Surfactant Solution Pumped | | | | | |
|---|---|---|---|---|---|---|
| Exp. # | Salt Conc gm/L | SDS ppm on water | SALT | gm SALT | ppm cation on water | Wt % cation on SDS |
| 9 | 0.4315 | 405 | FeSO4—7H2O | | 2.4 | 0.6026 |
| 10 | 0.1700 | 506 | CuSO4—5H2O | | 1.5 | 0.3006 |
| 11 | 0.3411 | 382 | CuSO4—5H2O | | 2.3 | 0.6035 |
| 12 | 0.5120 | 433 | CuSO4—5H2O | | 3.9 | 0.9055 |
| 13 | 0.4320 | 422 | FeSO4—7H2O | | 2.5 | 0.6031 |
| 14 | 0.2118 | 606 | ZnCl2 | | 4.3 | 0.062 |

| | Batch | Dispersion | | | STY |
|---|---|---|---|---|---|
| Exp. # | Time Min | % Solids | Dv(50) nm | Coag. % | gm/(L-hr) |
| 9 | 50.0 | 16.35 | 122 | 0.33 | 120.50 |
| 10 | 64.0 | 16.07 | 113 | 0.20 | 93.62 |
| 11 | 48.9 | 16.50 | 116 | 0.26 | 124.02 |
| 12 | 58.9 | 16.33 | 114 | 0.10 | 101.71 |
| 13 | 50.0 | 17.57 | 128 | 1.02 | 123.64 |
| 14 | 70.0 | 17.36 | 165 | 1.64 | 91.91 |

In these Experiments, the makeup TFE added is 1000 g. All of these polymerizations produce relatively low % coagulum and high STY as compared to Comparison Experiment 1. Further, all of these polymerizations produce PTFE having a melting temperature of greater than 332° C. and reduction in heat of fusion from the first heat to the second heat melting of greater than 28 J/gm.

When the process of these Experiments is repeated except that Na ion is used as the cation (supplied as the salt Na₂SO₃) in the amount to provide an Na⁺ ion concentration of 1.3 ppm based on the total weight of water upon completion of the polymerization reaction, the result is the formation of greater than 9% coagulum.

Example 5

This Example compares polymerization results using different metal cations similar to Example 4 except that the makeup of TFE is increased to 1250 g. The results are reported in Table 5.

TABLE 5

| | Surfactant Solution Pumped | | | | | |
|---|---|---|---|---|---|---|
| Exp. # | Salt Conc gm/L | SDS ppm on water | SALT | gm SALT | ppm cation on water | Wt % cation on SDS |
| 2 | 0.4320 | 424 | FeSO4—7H2O | 0.0778 | 2.6 | 0.6032 |
| 16 | 0.3411 | 399 | CuSO4—5H2O | 0.0576 | 2.4 | 0.6035 |
| 17 | 0.2671 | 1083 | MnSO4—H2O | 0.1290 | 6.5 | 0.6036 |
| 18 | 0.3877 | 1259 | NiSO4—6H2O | 0.2206 | 7.6 | 0.6019 |

| | Batch | Dispersion | | | STY |
|---|---|---|---|---|---|
| Exp. # | Time min | % Solids | Dv (50) nm | Coag. % | gm/(L-hr) |
| 2 | 51.2 | 17.94 | 150 | 1.12 | 132.80 |
| 16 | 48.0 | 17.74 | 131 | 0.03 | 139.35 |
| 17 | 125.5 | 17.96 | 171 | 1.11 | 56.68 |
| 18 | 146.3 | 17.84 | 183 | 1.43 | 48.90 |

Under the conditions of these Experiments, the metal ions $Fe^{+2}$ and $Cu^{+2}$ give the best combination of results in terms of particle size % coagulum and STY. The melting temperature of the PTFEs all exceeded 333° C. and the reductions in heats of fusion from the first heat to the second heat melting is 32.6 J/gm, 32.0 J/gm, 37.3 J/gm, and 37.3 J/gm for Experiments 2, 16, 17, and 18, respectively Example 6

This Example compares polymerization results using both different stabilizing surfactants and metal cations as passivation adjuvants, all with the TFE makeup amount being 2200 g. The results are reported in Table 6.

TABLE 6

| | Surfactant Solution Pumped | | | | | | |
|---|---|---|---|---|---|---|---|
| Exp. # | Salt Conc gm/L | Surf. | Surf. ppm on water | SALT | | ppm cation on water | Wt % cation on Surf. |
| 6 | 0.432 | SDS | 627 | FeSO4—7H2O | | 3.8 | 0.6032 |
| 7 | 0.388 | SDS | 659 | CuSO4—5H2O | | 4.5 | 0.6751 |
| 19 | 0.432 | K8300 | 1098 | FeSO4—7H2O | | 6.6 | 0.6031 |
| 20 | 0.388 | S-74 | 1366 | CuSO4—5H2O | | 9.4 | 0.6863 |
| 21 | 0.388 | S-70 | 994 | CuSO4—5H2O | | 6.8 | 0.6863 |

TABLE 6-continued

| Exp. # | Batch Time min | Dispersion % Solids | Dv (50) nm | Coag. % | STY gm/ (L-hr) |
|---|---|---|---|---|---|
| 6 | 72.9 | 27.48 | 183 | 1.66 | 162.8 |
| 7 | 76.4 | 26.99 | 161 | 0.17 | 150.4 |
| 19 | 125.9 | 26.67 | 199 | 2.52 | 92.9 |
| 20 | 162.8 | 26.27 | 154 | 0.23 | 72.9 |
| 21 | 118.3 | 26.33 | 153 | 3.26 | 94.8 |

All of the polymerizations produced small particles at the high % solids obtained, together with low % coagulum and good-to better STY than Comparison Experiment 1. The melting temperatures of the PTFEs produced all exceed 335° C. and the reduction in heats of fusion from the first heat to the second heat melting all exceed 29 J/gm.

Example 7

This Example compares polymerization results with different timing on the addition of the metal cation as passivation adjuvant to the aqueous medium in the reactor. SDS is the stabilizing surfactant, and $FeSO_4\text{-}7H_2O$ is the salt supplying the metal cation. The amount of TFE makeup is 1250 gm.

TABLE 7

| Exp. # | Batch Time min | Dispersion % Solids | Dv(50) nm | Coag. % | STY gm/ (L-hr) |
|---|---|---|---|---|---|
| 2 | 51.2 | 17.94 | 150 | 1.12 | 132.8 |
| 22 | 44.9 | 18.30 | 175 | 1.52 | 153.2 |
| 23 | 58.0 | 18.11 | 243 | 9.50 | 111.8 |

Experiment 2 follows the general polymerization procedure described above, wherein the salt (metal cation) is added to the aqueous polymerization medium in a solution along with dissolved stabilizing surfactant. The resultant solution is as described in Table 1.

Experiment 22 follows the general polymerization procedure, except for adding the entire amount of salt to the aqueous polymerization medium at the same time that addition of the surfactant solution to this medium commences. Thus the surfactant solution added to the aqueous polymerization medium has only the SDS dissolved therein. The total amount of SDS added to the aqueous medium provides a concentration of the of 382 ppm of SDS based on the total amount of water present in the aqueous medium upon completion of the polymerization. The amount of $Fe^{+2}$ cation added to the aqueous polymerization medium provides the concentration of 2.8 ppm based on the total amount of water present in the aqueous medium upon the completion of the polymerization reaction, as compared with 2.6 ppm for Experiment 2.

Experiment 23 follows the general polymerization procedure, except for adding the entire amount of salt, the same amount as in Experiment 22, to the aqueous polymerization medium along with the addition of the initial charge of 5200 gm of water to the reactor. Thus the SDS addition follows the procedure of Experiment 22.

The result as reported in Table 7 shows that addition of the salt too early in the process (Experiment 23) causes the particle size to be large for the % solids formed and the % coagulum to be high. The results of Experiments 2 and 22 are both improvements over Experiment 23.

The PTFE's obtained in the foregoing Experiments all exhibit an MFR of 0 (ASTM D 1238, 372° C., 5 kg weight), indicating the non-melt flowability of the PTFEs because of their extremely high molecular weight.

Example 8

This Example discloses Aspects A, B, and C of an embodiment of the present invention directed to the preparation of high solids content aqueous dispersion of PTFE particles, i.e. solids contents of 45 wt % and greater than 45 wt %, preferably 50 wt % and greater than 50 wt %, and more preferably 55 wt % and greater than 55 wt %, and up to 60 wt % or 65 wt % by polymerization, wherein the passivated stabilizing surfactant is hydrocarbon-containing surfactant. The disclosure hereinafter in this Example applies to each of these high solids contents. The "solids" in "solids contents" are the dispersed PTFE particles. The wt % solids contents are the weight % of the PTFE particles dispersed in the aqueous medium, based on the combined weight of the polytetrafluoroethylene particles in the dispersion and the total weight of water added to form the aqueous medium.

The practice of Aspect A of this embodiment involves the use of a much greater amount of hydrocarbon-containing surfactant, preferably hydrocarbon surfactant, metered to the aqueous medium for stabilizing the PTFE dispersion during the polymerization reaction. For example, the control experiment in Table 8 below uses 724 ppm total stabilizing surfactant concentration based on the total weight of dispersed PTFE particles to obtain a dispersion solids content in the aqueous medium of 33.9% (34 wt %). Aspect A uses more than 1.5× this amount, preferably at least 2× this amount, more preferably at least 3× this amount and most preferably at least 4× this amount, notwithstanding the warning in U.S. Pat. No. 3,000,892 that "these dispersing agents [hydrocarbon dispersing agents] normally inhibit the polymerization of tetrafluoroethylene" (col. 1, I. 65-66). Example II in '892 uses 2645 ppm of sodium lauryl sulfate (SDS) based on the total weight of PTFE present as dispersed particles to polymerize TFE to a PTFE dispersion in which the solids content reaches only 8.4 wt %.

Surprisingly, the use of a large amount of hydrocarbon-containing stabilizing surfactant in Aspect A is without appreciable loss in productivity of the reactor, which can be determined by space-time-yield (STY) of the polymerization reaction. Preferably the STY to produce the solids content of at least 45 wt % is at least 90% of the STY of the same polymerization process, except that the total amount of hydrocarbon-containing surfactant is smaller to provide the 34 wt % solids content. The use of a smaller amount of such surfactant to obtain 34 wt % (33-35 wt %) arises from the desire to reduce the amount of total surfactant so as to reduce telogenic effect on the polymerization reaction. More preferably, there is no decrease in such STY of the polymerization reaction. More preferred, and surprisingly, the STY is increased as compared to the aforesaid polymerization to obtain a solids content of 34 wt %, and this increase is preferably at least 5% more preferably, at least 10%.

The limitation on solids content of 8.4 wt % in Example II of '892 is the PTFE particle size of 0.23 micrometers obtained at this low solids content. This is a large particle size for so early in the particle growth stage represented by the solids content of only 8.4 wt %. The increase in particle size from 0.23 micrometers if the polymerization were driven to a higher solids content can be seen from information in the present application. Specifically, Experiment A-1 in Example 1 of the present application reports that the particle size of 198 nm at a solids content of 11.75 wt % grows to a 311 nm particle size if the polymerization were continued to 34 wt % solids content. Such a large particle size is undesirable because it reduces the stability of the dispersion of the particles, promoting the formation of coagulum. In contrast, the PTFE particle size of high solids content dispersions reported in Table 8 reveal much smaller PTFE particle sizes for the much higher solids contents of 45 wt % and higher.

It has been discovered that metering of the hydrocarbon-containing surfactant to the aqueous polymerization medium during polymerization to total a much greater amount of the surfactant enables the polymerization to be carried out to produce a stable dispersion having a substantially greater solids content, without any appreciable sacrifice in productivity as indicated by STY of the polymerization reaction. Accompanying this discovery is the additional surprise that the increased amount of hydrocarbon-containing stabilizing surfactant used in this embodiment of the present invention, while expected to inhibit the polymerization of TFE to make PTFE, does not inhibit such polymerization. The resultant PTFE forming the dispersed particles in the aqueous polymerization medium is of high molecular weight, i.e. having a molecular weight of at least 1,000,000, as indicated by non-melt flowability and DSC melting temperature (first heat) of at least 332° C.

Thus, Aspect A of the embodiment of this Example can be described as a polymerization process, comprising polymerizing fluoromonomer in an aqueous medium in a polymerization reactor to form a dispersion of fluoropolymer particles in the medium, is carried out in the presence of (i) polymerization initiator and (ii) hydrocarbon-containing surfactant stabilizing the dispersion in the aqueous medium in the reactor, the hydrocarbon-containing surfactant being passivated to reduce the telogenic behavior of the hydrocarbon-containing surfactant, wherein the fluoropolymer is polytetrafluoroethylene, and obtaining as a result thereof the dispersion of polytetrafluoroethylene particles constituting 45 wt % or greater of the aqueous medium. The surfactant added to the aqueous medium in the polymerization reactor is in an effective amount to provide this high solids content. This amount is preferably at least 3000 ppm based on the weight of the total weight of PTFE particles in the dispersion upon completion of the polymerization reaction.

As with lower solids contents dispersions of fluoropolymer particles made by polymerization in accordance with the present invention, the aqueous medium is essentially free of hydrocarbon-containing surfactant before the kicking off of the polymerization of the fluoromonomer, notwithstanding that hydrocarbon-containing nucleant surfactant may have been added to the aqueous medium to be oxidatively degraded to oleophilic nucleation sites prior to polymerization kickoff. Prior to polymerization kickoff, the aqueous medium is preferably also essentially free of halogen-containing surfactant and preferably no such surfactant is added to the polymerization medium during or after the kicking off of the polymerization reaction. The aqueous medium containing the dispersion of PTFE particles upon completion of the polymerization, i.e. as polymerized, is also preferably essentially free of halogen-containing surfactant, such as fluorosurfactant. More preferably, the aqueous medium is free of halogen-containing surfactant, including fluorosurfactant, meaning that no such surfactant has been added to the aqueous medium. The hydrocarbon-containing surfactant added to the aqueous medium in the reactor is essentially the only surfactant stabilizing the as-polymerized high solids content PTFE particle aqueous dispersion.

The disclosures under SUMMARY OF THE INVENTION and DETAILED DESCRIPTION OF THE INVENTION earlier in this patent application apply to the embodiment of this Example, which includes all of its Aspects. Thus, the description of the PTFE earlier in the present application in the section under Fluoromonomer/Fluoropolymer is applicable to the PTFE of this embodiment. The disclosure in the sections under The Polymerization Process and Polymerization Initiator earlier herein is also applicable to this embodiment, including e.g. the delay after polymerization kickoff before the addition of the hydrocarbon stabilization surfactant is commenced, the metering rate of this addition, the identity of the hydrocarbon-containing surfactant, the polymerization initiators that are used, the coagulum amounts, with the following exceptions: the wt % PTFE solids contents are higher than those mentioned under The Polymerization Process and the concentration step of adding surfactant to the aqueous dispersion after polymerization is completed to enable the dispersion to be concentrated to higher solids contents is unnecessary. High solids contents are obtained directly by polymerization without the need for a concentration step such as disclosed in U.S. Pat. No. 3,037,953 (Marks and Whipple). The dispersion of PTFE particles in the aqueous medium is also preferably free of anionic polyelectrolyte disclosed in US2007/0282044A as being an alternative to the anionic surfactant added to the aqueous dispersion after polymerization to enable the dispersion to be concentrated according to '953. With high solids contents represented by solids content of 45 wt % and greater than 45 wt %, any coagulum formation is preferably very small, e.g. 2 wt % or less than 2 wt % and more preferably 1 wt % or less than 1 wt %. This is a surprising accomplishment, in that the higher the solids content of the aqueous dispersion, the greater is the tendency for coagulum wt % to also increase. The high solids PTFE dispersions of the embodiment of this Example can be obtained with very small coagulum wt % as shown in Table 8.

The preferences disclosed in each of these sections under The Polymerization Process are also applicable to the embodiment of this Example. Also applicable to this embodiment is the disclosure of hydrocarbon-containing surfactant under Hydrocarbon-Containing stabilizing Surfactants and passivation under Passivation of the Hydrocarbon-Containing Stabilizing Surfactant, including the preferences disclosed thereunder.

Also applicable to the embodiment of this Example is the formation of polymerization sites in the aqueous medium prior to polymerization kickoff as disclosed under Polymerization Nucleation Sites, including the preferences disclosed thereunder. The preference for the formation of polymerization sites that are oleophilic nucleation sites includes the addition of a small amount of hydrocarbon-containing compound, preferably hydrocarbon-containing surfactant (nucleant surfactant) to the aqueous medium, preferably no greater than 50 ppm of the hydrocarbon-containing compound, preferably nucleant surfactant, to be subjected to oxidative degradation, leaving the aqueous medium essentially free of nucleant surfactant at the time of kick off of the polymerization reaction as described under Polymerization Nucleation Sites.

In the practice of Aspect A, preferably, the total amount of passivated hydrocarbon-containing stabilizing surfactant added to the aqueous medium is 3000 ppm and greater than 3000 ppm, more preferably 3500 ppm and greater than 3500 ppm, and most preferably 4000 ppm and greater than 4000 ppm, based on the total weight of PTFE present as dispersed particles, whether solids content is at least 45 wt %, at least 50 wt % or at least 55 wt %. The polymerization can be considered as being carried out in the presence of these amounts of passivated stabilizing surfactant. As the solids content is increased above 45 wt %, so does the preferred total amount of stabilizing surfactant. The greater amount of stabilizing surfactant as compared to that which is needed to produce a solids content of 34 wt % PTFE involves two differences from the metering preferred for obtaining a dispersion of PTFE particles providing a solids content of 34 wt %: increase in the metering amount and increase in the duration of metering, preferably without sacrifice in STY. Instead an increase in STY is obtained, e.g. an increase by at least 10% (calculation: [100−(STY for 34 wt % solids content/STY for 60 wt %)]× 100). The preferred metering rate of the stabilizing surfactant into the aqueous medium is from 0.7 g/l-hr to 1.4 g/l-hr as compared to the much smaller metering rates disclosed in earlier Examples for making PTFE in the present application. The maximum total amount of hydrocarbon-containing stabilizing surfactant is established by the high solids content desired along with the desired STY and minimized coagulum wt %. The maximum total amount should not penalize STY as described above and should produce a coagulum wt % 2 wt % or less than 2 wt %, more preferably, 1 wt % or less than 1 wt %. Generally, the total amount of hydrocarbon-containing stabilizing surfactant added to the aqueous medium will be no greater than 5500 ppm, based on the weight of the dispersed particles of PTFE Aspect B of the embodiment of this Example can be described as follows: In a polymerization reactor, a dispersion of PTFE particles in an aqueous medium having a solids content of the particles in the aqueous medium of 45 wt % or greater than 45 wt %, wherein the dispersion is maintained stable within the aqueous medium by passivated hydrocarbon-containing surfactant. By "maintained stable" is meant that without the presence of the hydrocarbon-containing stabilizing surfactant, the dispersion is unstable, i.e. the particles of PTFE coagulate within the reactor during the polymerization reaction. Coagulation during the polymerization reaction is exponential in the sense that once a small amount of coagulum is formed, e.g. 2 to 4 wt %, the formation of coagulum tends to increase thereafter at a more rapid rate to higher coagulum wt % s. It is this exponential increase in coagulum wt % that has generally limited polymerizations to less than 40 wt % solids contents for PTFE aqueous dispersions. If any other surfactant is present in the aqueous dispersion, such other surfactant does not stabilize the dispersion of PTFE particles. The dispersion is stable during the stirring accompanying the polymerization reaction and after the stirring has stopped upon completion of the reaction, resulting in the low coagulum wt %s described above in this Example and the ability to remove the dispersion from the reactor and store it without detriment to the dispersion.

Aspect C of the embodiment of this Example can be described as follows: A dispersion of PTFE particles in an aqueous medium having a solids content of the particles in the aqueous medium of at least 45 wt %, wherein the dispersion is maintained stable as described above within the aqueous medium by passivated hydrocarbon-containing surfactant.

In Aspects A, B, and C, the preferred hydrocarbon-containing stabilizing surfactant is anionic hydrocarbon surfactant, e.g. any of those disclosed above. In Aspects A, B and C, the preferred amounts of surfactant, preferably ionic surfactant added to or present in the aqueous medium is 3000 ppm or greater than 3000 ppm, more preferably 3500 ppm or greater than 3500 ppm, and most preferably 4000 ppm or greater than 4000 ppm, based on the total weight of PTFE present as dispersed particles, whether solids content is at least 45 wt %, at least 50 wt % or at least 55 wt %. These amounts also apply to the preferred anionic surfactant R-L-M described, especially $CH_3-(CH_2)_n$-L-M wherein n, L, and M are described above, and most especially to sodium dodecyl sulfate (SDS). In Aspects B and C, the aqueous medium is essentially free of hydrocarbon-containing surfactant other than the hydrocarbon-containing surfactant that stabilizes the high solids content dispersion of PTFE particles. In the practice of Aspects A and B, any hydrocarbon-containing surfactant added to the aqueous medium before the kicking off of the polymerization of the fluoromonomer is oxidatively degraded to oleophilic nucleation sites prior to polymerization kickoff. In Aspect B, the aqueous medium upon completion of the polymerization is also preferably essentially free of halogen-containing surfactant, most preferably free of halogen-containing surfactant, such as fluorosurfactant in each case. This also applies to the aqueous dispersion of PTFE particles of Aspect C. The description of "essentially free" earlier in this patent application applies in this Example 8. The aqueous dispersion of Aspect C is also preferably as-polymerized. In Aspects A and B, the hydrocarbon-containing surfactant is essentially the only surfactant maintaining the stability of the high solids content PTFE particle dispersion in the aqueous medium, preferably as polymerized.

Illustrative of the practice of the embodiment of this Example is the following experiment.

To a 12 liter, horizontally disposed, jacketed, stainless steel reactor with a two blade agitator is added 3100 gm of deionized, deaerated water and 250 gm of liquid wax. To the reactor is added an additional 500 gm of deionized, deaerated water which contains 0.120 gm of Pluronic® 31R1 and 0.07 gm of Tergitol® TMN-6. The reactor is sealed and placed under vacuum. The reactor pressure is raised to 30 psig (310 kPa) with nitrogen and vented to atmospheric pressure. The reactor is pressured with nitrogen and vented 2 more times. The agitator speed is set to 65 RPM and the reactor is heated to 90° C. 160 ml of initiator solution containing 2.0 gm of ammonium persulfate (APS) per liter of water is added to the reactor. 948 gm of TFE is charged to the reactor to bring the reactor pressure to 400 psig (2.86 MPa). At time zero, 150 ml of an initiator solution composed of 14.58 gm of disuccinic acid peroxide, 0.18 gm of ammonium persulfate and 485.2 gm of deionized water is precharged to the reactor at 80 ml/min. After 2.6 minutes from the start of initiator injection the reactor pressure drops 10 psi (69 kPa) from the maximum pressure observed during injection of the initiator solution. Reactor pressure is brought back to 400 psig (2.86 MPa) with TFE and maintained at that pressure for the duration of the polymerization. After 100 gm of TFE has been fed since kickoff corresponding to a 1.68 wt % PTFE concentration in the aqueous medium, surfactant solution containing 7.0 gm of SDS as the hydrocarbon stabilizing surfactant and 0.043 gm of iron sulfate heptahydrate per 100 gm of water is pumped to the reactor at a rate of 3 ml/min (1.05 gm/l-hr of SDS) until the end of the run. After 153 minutes since kickoff, 6500 gm of TFE and 444 ml of surfactant solution has been added to the reactor. The agitator is stopped, the reactor is vented to atmospheric pressure and the dispersion is discharged. Upon cooling, liquid wax is separated from the dispersion and the dispersion is filtered to remove undispersed solids. The reactor is opened and all adhered polymer removed from the reactor. Reactor cleanout is combined with the filtered solids and dried in a vacuum oven. To get a measure of coagulum (total undispersed solids) liquid wax adhering to this polymer is further removed by centrifuging the polymer. Total coagulum is thus determined to be 29.1 gm. 6461 gm of dispersed PTFE particles, providing a solids content in the aqueous medium of 59.1% and an average particle size by volume, Dv(50), of 233 nm. The total amount of SDS added to the aqueous medium is 4810 ppm based on the weight of the PTFE particles of the dispersion. STY is 208.8 g/l-hr. The dispersion of PTFE particles is coagulated by diluting the dispersion to about 10 wt % solids and adding aqueous ammonium carbonate solution followed by vigorous agitation until the polymer fully separates from the water. The PTFE is dried in a vacuum oven at 110° C. for 12 hours. Melting point of the PTFE as measured by DSC on first heat is 337.8° C. This experiment is G-16 in Table 8 below.

A large number of polymerizations are carried out essentially following the above polymerization procedure, but varying the total amount of hydrocarbon surfactant to the aqueous medium, with the results obtained being reported in Table 8 below.

TABLE 8

| Exp | Total Surf. ppm | % Solids | Dv (50) | Total Dispersed PTFE Gm | Coagulum wt % | STY gm/l-hr |
|---|---|---|---|---|---|---|
| Control | 724 | 33.9 | 224 | 3257 | 2.3 | 148 |
| 8-1 | 1321 | 47.6 | 245 | 4543 | 5.8 | 189 |
| 8-2 | 1777 | 49.0 | 248 | 5022 | 5.6 | 201 |
| 8-3 | 1905 | 50.4 | 225 | 5512 | 6.3 | 148 |
| 8-4 | 2406 | 53.0 | 232 | 5610 | 4.4 | 156 |
| 8-5 | 2669 | 53.1 | 237 | 5621 | 3.6 | 161 |
| 8-6 | 2943 | 55.1 | 230 | 5607 | 3.3 | 166 |
| 8-7 | 3012 | 53.7 | 233 | 6025 | 2.0 | 176 |
| 8-8 | 3081 | 53.3 | 234 | 5842 | 1.8 | 136 |
| 8-9 | 3126 | 52.4 | 231 | 5806 | 1.1 | 156 |
| 8-10 | 3881 | 54.3 | 223 | 6262 | 0.7 | 174 |
| 8-11 | 4038 | 54.6 | 247 | 6129 | 0.8 | 128 |
| 8-12 | 4149 | 59.3 | 240 | 6869 | 1.1 | 182 |
| 8-13 | 4273 | 57.7 | 238 | 6670 | 0.7 | 175 |
| 8-14 | 4475 | 55.1 | 236 | 6369 | 0.6 | 189 |
| 8-15 | 4479 | 56.9 | 232 | 6357 | 0.7 | 208 |
| 8-16 | 4810 | 59.1 | 233 | 6461 | 0.4 | 209 |
| 8-17 | 4653 | 60.4 | 242 | 6770 | 0.6 | 208 |

In Table 8, the surfactant is SDS, the control is polymerization using 724 ppm of SDS to obtain a solids content of 33.9 wt %. Ppm of Surfactant is based on the total dispersed PTFE produced.

The results in Table 8 show that as the total amount of SDS (Total Surf ppm) increases above 724 ppm, the coagulum wt % increases sharply up to about 2000 ppm SDS, followed by a decline through the 2000-3000 ppm SDS range, wherein the coagulum wt % is higher than desired for high wt % solids dispersions. For example, the coagulum wt % for 8-5 corresponds to 211 gm of coagulum, as compared to 77 gm of coagulum for the Control experiment. Within the 3000-4000 ppm SDS range, the wt % coagulum undergoes a transition, essentially from coagulum wt % of 2.0 wt % to less than 1.0 wt %. At 3012 ppm of total SDS added to the aqueous medium (8-7), the % coagulum is 2.0 wt %, while at 3881 ppm of total SDS added to the aqueous medium, the coagulum wt % is only 0.7 wt %. At total SDS amounts of at least 4000 ppm based on the total dispersed PTFE, the coagulum wt %s are consistently low, 6 out of 7 being less than 1.0 coagulum wt %. Experiment 8-16 shows that a 59% solids content dispersion can have a coagulum wt % of considerably less than 1. The same is true for the 60.4 wt % solids of Experiment 8-17. Experiments 8-1 through 8-6 can be improved with respect to coagulum wt %, by for example repeating the polymerization such as 8-10, but stopping (completing) the polymerization at a lower solids content, such as 45 wt % or 50 wt %. The coagulum wt % of 0.7 for 8-10 will be no higher when the polymerization is stopped upon reaching such lower solids content.

All of the PTFE polymers produced in these runs are high molecular weight, non melt flowable polymers, having a DSC first heat melting temperature of at least 336° C.

Example 9

This Example compares polymerizations with and without formation of polymerization sites prior to polymerization kickoff. The stabilizing surfactant is passivated prior to its addition to the polymerization reactor.

General procedure for polymerization with no polymerization site formation step prior to polymerization kickoff: To a 12 liter, horizontally disposed, jacketed, stainless steel autoclave with a two blade agitator is added 5700 gm of deionized, deaerated water and 250 gm of liquid wax. The autoclave is sealed and placed under vacuum. The autoclave pressure is raised to 30 psig (310 kPa) with nitrogen and brought to vacuum 3 times. Autoclave agitator is set at 65 RPM. The autoclave is heated to 90° C. and TFE is charged to the autoclave to bring the autoclave pressure to 400 psig (2.86 MPa). At time zero, 150 ml of initiator solution of deionized, deaerated water containing 0.05 gm of ammonium persulfate (APS) and 3.5 gm of disuccinic acid peroxide (DSP) is injected at 80 ml/min. Kickoff time ("KO Time" in Table A) is measured as the time (since time zero) necessary to drop 10 psi (69 kPa) from the maximum pressure observed during injection of the charge initiator solution. At kickoff, autoclave pressure is brought back to 400 psig (2.86 MPa) with TFE and maintained at that pressure for the duration of the polymerization. After 100 gm of TFE is fed since kickoff, a stabilizer surfactant solution is pumped to the autoclave at the rate of 4 ml/min. (0.28 g/l-hr). This delay in commencing the surfactant addition to the aqueous medium corresponds to a PTFE concentration in the aqueous medium of 1.68 wt % before this addition begins. Preparation of the stabilizer solution is given below. After 750 gm of TFE has been added to the autoclave since kickoff, the Batch Time (Table A) is recorded, the agitator is stopped, the autoclave is vented to atmospheric pressure and the dispersion is discharged. Upon cooling, wax is separated from the dispersion. The PTFE dispersion has a pH of 2.8, % solids of 11.75 and Dv(50) of 198 nanometers (experiment A-1). The PTFE has a high molecular weight as indicated by DSC melting temperature of 332° C. (1st heating) and DSC heats of fusion of 76 J/g (1$^{st}$ heating) vs 47.5 J/g (2$^{nd}$ heating), reflecting the extremely high melt viscosity of the PTFE reducing the amount of recrystallization occurring during cooling from the first heating.

The surfactant in the surfactant stabilizing solution used in the above procedure is passivated by the following procedure: In a 1 liter, jacketed round bottom flask is added 681.74 gm of deionized, deaerated water, 10.5 gm of sodium dodecyl sulfate (ACS Reagent, >99.0%) and 0.315 gm of Iron(II) sulfate heptahydrate. The contents are agitated until all solids are dissolved. The solution pH is adjusted to 2.0-2.5 with 12 to 14 drops of concentrated sulfuric acid. 37.34 gm of 30 wt % hydrogen peroxide aqueous solution is slowly added to the agitating mixture. Agitation continues for 1 hr at room temperature (22-23° C.) after which time the resultant oxidized surfactant in aqueous solution is used in the above polymerization procedure.

The above polymerization procedure has no step of forming polymerization sites prior to polymerization kickoff, and the polymerization result is reported as A-1 in Table A.

The step of forming polymerization sites is practiced by repeating the above polymerization procedure except that 5200 gm of deionized, deaerated water and 250 gm of liquid wax is the initial charge to the autoclave. Then, 500 gm of deionized, deaerated water containing 0.085 gm of surfactant (Nucleant, Table A) and 0.4 gm of sodium sulfite water-soluble inorganic salt is added to the autoclave. After heating the autoclave to polymerization temperature but before charging TFE to bring the autoclave to operating pressure, 50 ml of an aqueous solution containing 0.5 gm of APS per liter of deionized, deaerated water is added. The surfactant concentration is 14.8 ppm (calculation: $[0.085 \div 5750] \times 10^6$), the salt concentration is 70 ppm, and the initiator concentration is 4.3 ppm. in the aqueous medium Under the conditions/additives present in the aqueous medium (precharge composition), the APS causes an oxidation reaction of the hydrocarbon surfactant to occur, resulting in the formation of oleophilic nucleation sites dispersed in the aqueous medium. The presence of these sites is indicated by the smaller particle size (Dv(50) of the PTFE particles reported in Table A for experiments A-3 through A-9, using nonionic, anionic, and cationic surfactants. The long time to polymerization kickoff for experiment A-9 is attributed to the aromatic moiety present in this surfactant, the other surfactants used being non-aromatic, i.e. free of aromatic moiety. It is contemplated that this kickoff time can be reduced by reducing the amount of this surfactant used. The delay in this repeat experiment reported as experiments A-3 to A-9 in Table A is 1.67 wt % fluoropolymer concentration before the stabilizing surfactant addition begins (calculation: 100 gm TFE÷[100+5200+500+50+150]×100). The actual time of delay for all the experiments reported in Table A range from 4.4 to 6 min. after kickoff before the stabilizing surfactant addition begins.

Experiment A-2 is the result of the polymerization procedure described above in which no nucleation surfactant is present, except that the sodium sulfite salt is added in the amount show in Table A. The presence of the salt and no nucleation surfactant results in a much larger PTFE particle size suggesting that the salt is causing fewer polymer particles to be formed during the initial stage of polymerization.

The above polymerizations are conducted as a screening series of polymerizations, i.e. carried out to dispersion PTFE solids (particles) content of about 11-13 wt %, based on total weight of the polymerization medium, resulting from the feed of just 750 gm of TFE after kickoff to the autoclave for the polymerization reaction. This screening result available from the above polymerizations can be extrapolated to the polymerization result if the polymerization were extended to consume 3200 g of TFE to produce a dispersion solids content of about 34 wt %. This extrapolation is explained under the EXAMPLES section earlier herein. This extrapolated result is reported in Table A as the Dv(50) in parenthesis Experiment A-1 uses delayed addition of the surfactant and its metering as the polymerization reaction proceeds. Neither nucleant nor salt is used, i.e. the nucleation step procedure described above is not used. Experiment A-2 shows the disadvantage in just using the salt addition, without formation of nucleation sites, i.e. no nucleant surfactant is used. Experiment A-2 obtains a poorer result as a much larger Dv(50) particle size, much larger than for experiment A-1. Comparison of the Dv(50) results of experiment A-1 with experiments A-3 to A-10 reveals the effect of the oleophilic nucleation sites present in experiments A-3 to A-10) on providing a smaller fluoropolymer particle size. The batch time for experiment A-1 is comparable to the batch times for experiments A-3 to A10, indicating that delayed addition of the passivated stabilizing surfactant to the aqueous medium together with metering of subsequent additions of the surfactant to the aqueous medium was effective to reduce telogenicity of the passivated hydrocarbon surfactant.

The above polymerization procedure is repeated in a series of experiments in which the nucleation step and different salts are included in the polymerization procedure (experiments B-1 to B-3) and no inorganic salt is added in the nucleation site forming step in experiment B-4. The nucleant is 14.8 ppm Pluronic® 31R1. The amount of salt is 70 ppm and the amount of APS initiator is 4.3 ppm. The delay in commencing the stabilizing surfactant addition is 1.67 wt % PTFE concentration in the aqueous medium. The results are reported in Table B.

TABLE A

| Exp. # | Nucleant Name | Na2SO3 Ppm | KO Time min | Batch Time "B" min | Solids % | Dv (50) nm | Particles Number | Polymer Made gm |
|---|---|---|---|---|---|---|---|---|
| A-1 | | | 4.3 | 37.9 | 11.75 | 198 (311) | 9.44E+16 | 829 |
| A-2 | | 70 | 2.4 | 45.4 | 12.06 | 358 (556) | 1.64E+16 | 853 |
| A-3 | Pluronic ® 31R1 | 70 | 3.4 | 36 | 11.97 | 113 (176) | 5.20E+17 | 849 |
| A-4 | Avanel ® S70 | 70 | 4.4 | 34.1 | 12.04 | 119 (184) | 4.51E+17 | 859 |
| A-5 | Silwet ® L7600 | 70 | 2.8 | 30.1 | 11.97 | 130 (202) | 3.43E+17 | 852 |
| A-6 | Avanel ® S74 | 70 | 3.4 | 33.2 | 12.18 | 134 (207) | 3.21E+17 | 874 |
| A-7 | Tergitol ® 100 | 70 | 4.8 | 33.1 | 11.85 | 136 (213) | 2.94E+17 | 837 |
| A-8 | CTMAB | 70 | 3 | 36.8 | 11.84 | 160 (251) | 1.80E+17 | 833 |
| A-9 | Triton ® X-100 | 70 | 20.9 | 44.4 | 11.82 | 154 (241) | 2.03E+17 | 838 |

Nucleants in Table A have the following identity:
Silwet ® L7600 is a nonionic pendant-type polyethyleneoxide-modified polydimethylesiloxane available from GE Silicones.
Tergitol ® 100 is a 70/30 wt % blend of TMN 6/TMN 10 identified earlier herein as members of the Tergitol ® TMN series of surfactants, which are branched nonionic surfactants having the structure shown above.
CTMAB is cetyltrimethylammonium bromide (CH3(CH2)15N(CH3)3Br), a cationic surfactant.
Triton ® X-100 is a nonionic surfactant, which is octyl phenol polyethoxy alcohol having the structure shown above.

TABLE B

| Exp. # | Salt Name | Batch Time min | Dispersion solids % | Dv (50) Nm | Particles Number | Polymer Made gm |
|---|---|---|---|---|---|---|
| B-1 | Na$_2$SO$_3$ | 33.1 | 11.81 | 118 | 4.404E+17 | 818 |
| B-2 | NaHSO$_3$ | 38.3 | 11.72 | 95.1 | 8.487E+17 | 826 |
| B-3 | Na$_2$S$_2$O$_5$ | 40.3 | 11.92 | 107 | 6.016E+17 | 833 |
| B-4 | — | 36.0 | 11.68 | 125 | 3.81E+17 | 842 |

As shown in Table B, different inorganic salts all provide small PTFE particle sizes. Experiment B-4 shows the Dv(50) result when nucleant surfactant, but no inorganic salt is used.

The PTFE made in all these polymerizations exhibits the characteristics described earlier in this Example.

Example 10

This Example compares polymerization results for preparing PTFE having the characteristics of the PTFE of Example 9 by using different delays after polymerization kickoff, for introducing the stabilizing surfactant, unpassivated, and passivated, into the aqueous polymerization medium.

A summary of the polymerization conditions is as follows: 5700 gm of deionized, deaerated water is charged to the reactor with 0.085 gm of Pluronic® 31R1, 0.02 gm of Triton X-100 and 0.4 gm of $Na_2SO_3$ and heated to 90° C. Then, 80 ml (0.04 gm APS) is added to the aqueous medium. The concentrations of surfactants in the aqueous medium are 14.7 ppm and 3.4 ppm, respectively, and the concentration of salts is 69 ppm and of the initiator is 6.9 ppm. The reactor is pressured up to 400 psig (2.86 MPa) with the addition of 660 gm of TFE. For initiating the polymerization, 150 ml of an initiator solution containing 0.33 gm APS and 22.33 g (70% active DSP) per liter of deionized, deaerated water is added to the reactor. After kickoff (KO) the pressure is maintained at 2.86 MPa with the addition of TFE. At 22 gm TFE feed (experiments C-3 and C-4) or 300 gm TFE feed (experiments C-1 and C-2, the introduction of the SDS or SOS stabilizing surfactants into the aqueous polymerization medium is begun. The delay of 22 gm of TFE being consumed before surfactant addition is commenced corresponds to a PTFE concentration in the aqueous medium of 0.37 wt %. The delay of 300 gm of TFE being consumed before surfactant addition is commenced corresponds to a PTFE concentration in the aqueous medium of 5.06 wt %. Stabilizer surfactant solution is pumped into the aqueous medium at a rate of 2 ml/min until 1000 gm of TFE feed. This pumping rate is a metering rate of 0.14 g/l-hr. Then, the pump rate is raised to 3 ml/min (0.22 g/l-hr). The concentration of SDS or SOS in the pump solution is 1.445 gm per 100 gm of fluid.

TABLE C

| Exp. | Stabilizer ppm | Stabilizer Type | Start Stabilizer gm TFE Fed | Stop Stabilizer gm TFE Fed | Batch Time min | Dv (50) nm | % solids % |
|---|---|---|---|---|---|---|---|
| C-1 | 898 | SDS | 300 | 2200 | 166 | 235 | 26 |
| C-2 | 1327 | SOS | 300 | 1760 | 464 | 196 | 2 |
| C-3 | 1327 | SDS | 22 | 968 | 464 | 146 | 18 |
| C-4 | 1327 | SOS | 22 | 1348 | 464 | 174 | 23 |

The results shown in this Table is that the delay of 22 gm (0.37 wt % fluoropolymer formed) is preferably lengthened to produce a higher wt % fluoropolymer before surfactant addition begins, otherwise the batch time of 464 min is longer than desired for the % solids produced. Upon reaching this batch time, the polymerization reaction is stopped, without the TFE monomer feed ever reaching the 2200 gm PTFE goal. Experiment C-1 provides the best result, enabling the 2200 gm goal to be met in a much shorter batch time than experiments C-2 through C-4.

The above polymerizations are repeated with the following changes: The Stabilizer (stabilizing surfactant) is passivated. The initiator pump rate is faster (4.0 ml/min.), and the delay in stabilizer surfactant feed is until 100 gm of TFE makeup feed to the reactor after kickoff. This delay corresponds to a PTFE concentration in the aqueous medium of 1.66 wt %. These changes in the repetition of the polymerizations are undertaken in recognition of the benefit (reduced telogenicity) of the stabilizing surfactant being passivated as described below. Pumping continues to the end of the run. The results are shown in Table D.

The SDS and SOS (sodium octyl sulfonate) stabilizing surfactants are passivated prior to introduction into the aqueous polymerization medium according to the following procedure:

Into a 1 L glass bottle, 10.5 gm of sodium dodecyl sulfate is added to 681.74 gm of deaerated water and further stirred using stir bar until all solids are dissolved and the solution is clear. 0.315 gm of iron ($^{+2}$) sulfate heptahydrate is added to this solution at room temperature. The pH is then adjusted to 2.0-2.5 with 12-14 drops of conc. $H_2SO_4$. The contents of this bottle are transferred to a 3-necked 1 L glass reactor that has a heating/cooling jacket equipped with thermometer and an overhead stirrer. 37.34 gm of $H_2O_2$ (30% solution) are then added slowly to this stirred solution. The solution is then further stirred at room temperature for 60 additional minutes after completion of the $H_2O_2$ addition. The solution containing the resultant passivated SDS reaction is then discharged into 1 L glass bottle, and this is the solution used for pumping stabilizing surfactant into the polymerization reaction. The same passivation procedure is used for SOS, except that it is added to the IL glass bottle as a solution in water, available as Witconate® NAS-8 surfactant, to provide the same 10.5 gm of SOS.

TABLE D

| Example | Start Stabilizer ppm | Stabilizer Type | Stabilizer gm TFE Makeup Feed | TFE Makeup gm | Batch Time min | Dv (50) nm | % solids % |
|---|---|---|---|---|---|---|---|
| D-1 | 922 | SDS | 100 | 3100 | 110 | 188 | 34 |
| D-2 | 1127 | SOS | 100 | 3100 | 134 | 194 | 16 |

The passivation of the SDS and SOS stabilizing surfactants results in much shorter batch times to make a greater amount of dispersed PTFE.

Example 11

This Example provides the preparation of modified PTFE. Passivation of the stabilizing surfactant is preformed prior to its addition to the polymerization reactor.

To a 12 liter, horizontally disposed, jacketed, stainless steel autoclave with a two blade agitator is added 5200 gm of deionized, deaerated water and 250 gm of liquid wax. To the autoclave is added an additional 500 gm of deionized, deaerated water which contains 0.02 gm of Pluronic® 31R1 and 0.4 gm of sodium sulfite. The autoclave is sealed and placed under vacuum. The autoclave pressure is raised to 30 psig (310 kPa) with nitrogen and vented to atmospheric pressure. The autoclave is pressured with nitrogen and vented 2 more times. The agitator speed is set to 65 RPM and the reactor is heated to 90° C. 40 ml of initiator solution containing 0.5 gm of ammonium persulfate (APS) per liter of water is added to the reactor. This is the precharge composition. The concentrations of Pluronic surfactant, salt, and initiator are 3.4 ppm, 69.6 ppm, and 3.5 ppm, respectively.

The reactor is pressured up by charging the reactor with 12.0 gm of hexafluoropropylene (HFP) and 650 gm of TFE to bring the reactor pressure to 400 psig (2.86 MPa). At time zero, 150 ml of an initiator solution composed of 11.67 gm of disuccinic acid peroxide solution (70 wt % DSP), 0.17 gm of ammonium persulfate and 488.3 gm of deionized, deaerated water is charged to the reactor at 80 ml/min. After 2.0 minutes from the start of initiator injection the reactor pressure drops 10 psi (69 kPa) from the maximum pressure observed during injection of the initiator solution. Autoclave pressure is brought back to 400 psig (2.86 MPa) with TFE and maintained at that pressure for the duration of the polymerization. After 100 gm of TFE has been fed since kickoff, stabilizing surfactant solution (preparation described below) is pumped to the reactor at a rate of 4 ml/min (0.28 g/l-hr) until the end of the run. This delay in commencing the surfactant addition to the aqueous medium corresponds to 1.67 wt % concentration of modified PTFE in the aqueous medium. After 155.6 minutes since kickoff, 3100 gm of TFE and 688 ml of stabilizer surfactant solution has been added to the reactor. The agitator is stopped, the reactor is vented to atmospheric pressure and the dispersion is discharged. Upon cooling, liquid wax is separated from the dispersion and the dispersion is filtered to remove undispersed solids (coagulum). The reactor is opened and all coagulum is removed from the reactor. Reactor cleanout is combined with the filtered solids and dried in a vacuum oven. To get a measure of coagulum (total undispersed solids), liquid wax adhering to this polymer is further removed by centrifuging and blotting the polymer. Total coagulum is thus determined to be 120.4 gm. Total recovered liquid wax is 208.7 gm. The dispersed fluoropolymer particles constitute 32.8 wt % of the aqueous medium containing this dispersion. The dispersed particles have an average particle size by volume, Dv(50), of 255 nm. These particles are coagulated by diluting the dispersion to about 10 wt % solids and adding aqueous ammonium carbonate solution followed by vigorous agitation until the polymer particles fully separate from the water. The polymer is dried in a vacuum oven at 110° C. for 12 hours. Melting point of this polymer as measured by DSC on first heat is 335° C. Compositional analysis by FTIR gives 0.5 wt % HFP. This modified PTFE has a molecular weight (Mn) exceeding $10^6$ and a melt creep viscosity exceeding $10^6$ Pa·s and a melting temperature exceeding 334° C. (first heating).

The stabilizer surfactant solution is prepared as follows: In a 1 liter, jacketed round bottom flask is added 492.5 gm of deionized, deaerated water, 7.5 gm of sodium dodecyl sulfate (ACS Reagent, >99.0%) and 0.225 gm of Fe ($^{+2}$) sulfate heptahydrate. The contents are agitated until all solids are dissolved. The solution pH is adjusted to 3.22 with two drops of concentrated Sulfuric Acid. 18.75 gm of 30 wt % hydrogen peroxide is added to the mixture. The mixture is heated to 40° C. while stirring and held at temperature for 2 hours to passivate the SDS. The solution is discharged and cooled in an ice bath to rapidly bring the fluid to ambient temperature. The final mixture has a pH of 2.76.

Example 12

This Example compares polymerization results from stabilizing surfactant passivated at different temperatures prior to addition to the polymerization reactor. The passivation procedure is as follows: In a 1 liter, jacketed round bottom flask is added 681.74 gm of deionized, deaerated water, 10.5 gm of sodium dodecyl sulfate (ACS Reagent, >99.0%) and 0.315 gm of Fe($^{+2}$) sulfate heptahydrate. The contents are agitated until all solids are dissolved. The solution pH is adjusted to 2.0-2.5 with 12-18 drops of concentrated sulfuric acid. While holding the mixture at the desired passivation temperature(PT) as shown for experiments E-1, E-2, and E-3 in table E, by circulating thermally regulated water through the flask jacket, 37.34 gm of 30 wt % hydrogen peroxide is added to the mixture. The mixture is agitated for 1 hour before being discharged and rapidly cooled to room temperature using an ice bath.

The polymerization procedure is as follows: To a 12 liter, horizontally disposed, jacketed, stainless steel autoclave with a two-blade agitator is added 5200 gm of deionized, deaerated water and 250 gm of liquid wax. To the autoclave is added an additional 500 gm of deionized, deaerated water which contains 0.085 gm of Pluronic® 31R1, 0.02 gm of Triton® X-100 and 0.4 gm of sodium sulfite. The autoclave is sealed and placed under vacuum. The autoclave pressure is raised to 30 psig (310 kPa) with nitrogen and brought to vacuum 3 times. The agitator speed is set to 65 RPM and the reactor heated to 90° C. 0.04 g APS initiator is next charged to the heated aqueous medium (80 ml of 0.5 g/l initiator solution in deionized, deaerated water) to provide an APS concentration in the precharge of 6.9 ppm. The surfactant concentrations are 14.7 ppm and 3.5 ppm, respectively, and the salt concentration is 70 ppm in the aqueous medium. TFE is charged to the reactor to bring the reactor pressure to 400 psig (2.86 MPa). At time zero, 150 ml of an initiator solution composed of 11.67 gm of (70% active) disuccinic acid peroxide, 0.17 gm of ammonium persulfate (APS) and 488.3 gm of deionized, deaerated water is charged to the reactor at 80 ml/min. Approximately 7 minutes from the start of initiator injection the reactor pressure drops 10 psi (69 kPa) from the maximum pressure observed during injection of the initiator solution. Autoclave pressure is brought back to 400 psig (2.86 MPa) with makeup TFE and maintained at that pressure for the duration of the polymerization by continuous addition of makeup TFE. After 100 gm of TFE has been fed since kickoff, surfactant solution is pumped to the reactor at a rate of 4 ml/min until the end of the run. This delay in commencing addition of the stabilizing surfactant to the aqueous medium corresponds to a PTFE concentration in the aqueous medium of 1.66 wt %, and the metering rate of the surfactant into the aqueous medium is 0.29 g/l-hr. The batch time (time from kickoff to the end of makeup TFE addition) is shown in the table below. After 3100 gm of makeup TFE has been added to the reactor, the agitator is stopped, the reactor is vented to atmospheric pressure and the dispersion is discharged. Upon cooling, liquid wax is separated from the dispersion and the dispersion is filtered to remove undispersed solids. The reactor is opened and all adhered polymer removed from the reactor. Reactor cleanout is combined with the filtered solids and dried in a vacuum oven. To get a measure of coagulum (total undispersed solids) liquid wax adhering to this polymer is further removed by centrifuging and blotting the polymer. Coagulum thus obtained in these examples is 35-38 grams. Aqueous dispersion produced is 9.7 kg with 34% solids and an average particle size by volume, Dv(50), as shown in the Table E below. Polymer is coagulated by diluting the dispersion to about 10 wt % solids and adding aqueous ammonium carbonate solution followed by vigorous agitation until the polymer fully separates from the water. The polymer is dried in a vacuum oven at 110° C. for 12 hours. The PTFE exhibits the molecular weight and melt creep viscosity characteristics of the PTFE described in Example 11.

TABLE E

| Experiment | PT Temp. °C. | Batch Time min. | Dv(50) Nm |
|---|---|---|---|
| E-1 | 22 | 110.1 | 188 |
| E-2 | 30 | 109.2 | 176 |
| E-3 | 40 | 152.4 | 197 |

The batch time falls sharply from passivation of the stabilizing surfactant at 40° C. to passivation at lower temperatures.

Example 13

The Example compares polymerization performance using passivated and unpassivated stabilizing surfactant. Passivation of the stabilizing surfactant is performed prior to addition to the polymerization reactor.

To a 12 liter, horizontally disposed, jacketed, stainless steel autoclave with a two blade agitator is added 5200 gm of deionized, deaerated water and 250 gm of liquid wax. To the autoclave is added an additional 500 gm of deionized, deaerated water which contains 0.075 gm of Pluronic® 31R1 and 0.2 gm of sodium sulfite. The autoclave is sealed and placed under vacuum. The autoclave pressure is raised to 30 psig (310 kPa) with nitrogen and brought to vacuum three times. Reactor agitator is set at 65 RPM. The reactor is heated to 90° C. and 100 ml of initiator containing 0.5 gm APS per liter of deionized, deaerated water is added to the reactor, providing an APS concentration of 8.6 ppm in the precharge composition. The concentration of the surfactant is 12.9 ppm and of the salt is 34.5 ppm.

690 gm of TFE is added to the reactor to bring the reactor pressure to 400 psig (2.86 MPa). At time zero, 150 ml of initiator solution containing 0.5 gm APS per liter of deionized deaerated water is charged to the reactor at 80 ml/min and then the pump rate is reduced to 1.0 ml/min for the duration of the polymerization. Kickoff is measured as the time (since time zero) necessary to drop 10 psi (69 kPa) from the maximum pressure observed during injection of the charge initiator solution. Kickoff occurs in 2 minutes and the autoclave pressure is brought back to 400 psig (2.86 MPa) with makeup TFE and maintained at that pressure for the duration of the polymerization by continuous addition of makeup TFE. After 300 gm of makeup TFE has been added to the reactor, a pump solution containing 8.0 gm of unpassivated sodium dodecyl sulfate per liter of water is added to the reactor at a rate of 2.0 ml/min until a total of 300 gm of solution has been added. The time delay between kickoff and commencement of the SDS addition is 9.3 min, the concentration of PTFE in the aqueous medium at the end of this time delay is 4.79 wt %, and the surfactant metering rate is 0.08 g/l-hr. After 197 minutes from time zero, 2200 gm of makeup TFE has been added to the reactor, the agitator is stopped, the reactor is vented to atmospheric pressure and the dispersion is discharged. PTFE dispersion thus made has 28% solids and a raw dispersion particle size of 213 nm. A polymer sample is obtained by diluting a quantity of dispersion to approximately 10 wt % solids, adding an aqueous solution of ammonium carbonate and vigorously agitating to separate the polymer from the aqueous phase. Polymer is washed with deionized water and dried in a vacuum oven at 110° C. for approximately 12 hours before being further analyzed. The PTFE exhibits the characteristics of the PTFE as described in Example 11.

The above experiment is repeated except that after 300 gm of makeup TFE is added to the reactor, a pump solution containing 14.4 gm of passivated sodium dodecyl sulfate per liter of water is added to the reactor at a rate of 1.67 ml/min until the end of the run at which time 2200 gm of makeup TFE has been added to the reactor. The delay in commencing the addition of the passivated SDS to the aqueous medium is 9.7 min, the PTFE concentration at the end of the delay is 4.79 wt %, and the metering rate of the surfactant into the aqueous medium is 0.12 g/l-hr. Total quantity of passivated sodium dodecyl sulfate solution added is 115 ml. The batch time of 79 minutes is significantly less than for the unpassivated experiment in the preceding paragraph. The dispersion measures 26.5% solids and has a raw dispersion particle size of 175 nm. The PTFE exhibits the characteristics of the PTFE as described in Example 11.

The passivation of the SDS is carried out by the following procedure: Into a 1 liter, jacketed round bottom flask is added 681.74 gm of deionized, deaerated water, 10.5 gm of sodium dodecyl sulfate (ACS Reagent, >99.0%) and 0.315 gm of iron($^{+2}$) sulfate heptahydrate. The contents are agitated until all solids are dissolved. The solution pH is adjusted to 2.0-2.5 with 12-18 drops of concentrated sulfuric acid. While holding the mixture at 22° C. by circulating thermally regulated water through the flask jacket, 37.34 gm of 30 wt % hydrogen peroxide is added to the mixture. The mixture is agitated for 1 hour before being discharged for use as the solution of passivated stabilizing surfactant in polymerization.

In this example, the amount of passivation adjuvant, $Fe^{+2}$, is 0.603 wt % based on the total weight of the hydrocarbon-containing surfactant, SDS, added to the polymerization reactor. The amount of $Fe^{+2}$ based on water in the reactor at the end of the batch is ppm.

Example 14

This Example discloses the polymerization to make PTFE using an ethoxylated anionic surfactant as the stabilizing surfactant. Passivation of the stabilizing surfactant is performed prior to its addition to the polymerization reactor.

To a 12 liter, horizontally disposed, jacketed, stainless steel autoclave with a two blade agitator is added 5200 gm of deionized, deaerated water and 250 gm of liquid wax. To the autoclave is added an additional 500 gm of deionized, deaerated water which contains 0.085 gm of Pluronic® 31R1, 0.02 gm of Triton® X-100 and 0.4 gm of $Na_2SO_3$. The autoclave is sealed and placed under vacuum. The autoclave pressure is raised to 30 psig (310 kPa) with nitrogen and brought to vacuum three times. Reactor agitator is set at 65 RPM and the reactor is heated to 90° C. 80 ml of initiator solution containing 0.5 gm of ammonium persulfate (APS) per liter of deionized, deaerated water is added to the reactor, providing an APS concentration in the aqueous precharge of 6.9 ppm. The concentration of the surfactants in the aqueous medium are 14.7 ppm and 3.5 ppm, respectively, and the salt concentration is 69.2 ppm. TFE is charged to the reactor to bring the reactor pressure to 400 psig (2.86 MPa). At time zero, 150 ml of an initiator solution in deionized, deaerated water containing 0.33 gm APS and 23.33 gm of 70 wt % active disuccinic acid peroxide (DSP) per liter of water is charged to the reactor at 80 ml/min. Kickoff time is measured as the time (since time zero) necessary to drop 10 psi (69 kPa) from the maximum pressure observed during injection of the initiator solution at time zero. Kickoff occurs in 6.8 minutes. The autoclave pressure is brought back to 400 psig (2.86 MPa) with makeup TFE and maintained at that pressure by adjusting makeup TFE flow for the duration of the polymerization. After 100 gm of makeup TFE has been fed, a passivated stabilizing solution containing Avanel® S70 is pumped at a rate of 4 ml/min until the end of the run. The time delay in commencing the addition of stabilizing surfactant to the aqueous medium is 7.9 min, the wt % delay corresponds to a PTFE concentration in the aqueous medium of 1.66 wt %, and the metering rate of the surfactant into the aqueous medium is 0.288 g/l-hr. After 2200 gm of TFE has been added to the reactor since Time Zero, the agitator is stopped, the reactor is vented to atmospheric pressure and the dispersion is discharged. The resultant aqueous dispersion has 24.7% solids having an average particle size by volume, Dv(50), of 178 nm. Polymer is coagulated by diluting the dispersion to about 10 wt % solids and adding aqueous ammonium carbonate solution followed by vigorous agitation until the polymer fully separates from the water. The PTFE is dried in a vacuum oven at 110° C. for 12 hours, and it is determined to exhibit the characteristics of the PTFE of Example 11.

The procedure for passivating the Avanel® surfactant is as follows: To a 1 liter glass bottle is added 30 gm of Avanel® S70 solution (10.5 gm active surfactant), 662.24 gm of deionized, deaerated water and 0.315 gm of iron(+2) sulfate heptahydrate. The mixture is stirred until all solids are dissolved. pH of this mixture is adjusted to 2.0-2.5 with 12 to 16 drops of concentrated sulfuric acid. While agitating and holding at 22-23° C., 37.34 gm of 30 wt % hydrogen peroxide is slowly added to the mixture over a period of 1 to 2 minutes. After addition of the hydrogen peroxide stirring is continued for 1 hour before the resulting passivated surfactant solution is used in the above polymerization.

In this Example, the amount of passivation adjuvant, $Fe^{+2}$, is 0.603 wt % based on the total weight of the hydrocarbon-containing surfactant, Avanel® S70, added to the polymerization reactor. The amount of $Fe^{+2}$ based on water in the reactor at the end of the batch is 6.84 ppm.

The PTFE's and modified PTFE obtained in the foregoing Examples all exhibit an MFR of 0 (ASTM D 1238, 372° C., 5 kg weight), indicating the non-melt flowability of the PTFEs because of their extremely high molecular weight.

Example 15

This Example discloses the polymerization to make fluoroelastomer of VF2/HFP/TFE using sodium dodecyl sulfate as the stabilizing surfactant. Passivation of the stabilizing surfactant is performed prior to its addition to the polymerization reactor.

To a 40 liter, vertically disposed, jacketed, stainless steel autoclave reactor is added 23000 gm of deionized, deaerated water. To the reactor is added an additional 2016 gm of deionized, deaerated water which contains 0.04 gm of Pluronic® 31R1 and 2.02 gm of sodium sulfite. The reactor is purged with start-up monomer mixture (4.0 wt % vinylidene fluoride (VF2), 86.0 wt % hexafluoropropene (HFP), and 10.0 wt % tetrafluoroethylene (TFE)) to 410 kPa and evacuated. This purging procedure is repeated until the oxygen in the reactor is less than 100 ppm. 16 ml initiator solution of 1 wt % ammonium persulfate and 5 wt % disodium phosphate heptahydrate is added to the reactor. The reactor is heated to 80° C. The reactor is pressurized with 2120 grams of start-up monomer (with the above composition). At the end of pressurization, the reactor pressure is 2068 kPa. At time zero, 50 ml of an initiator solution of 1 wt % ammonium persulfate and 5 wt % disodium phosphate heptahydrate is added to the reactor to start polymerization. As the reactor pressure drops, a fresh feed monomer mixture of 35.0 wt % VF2, 37.0 wt % HFP, and 28.0 wt % TFE is fed to the reactor to maintain a 2068 kPa pressure. Additional initiator solution is added in increments of 10 ml every 30 minutes to maintain polymerization rate. After 200 gm of fresh feed monomer mixture has been fed, stabilizing surfactant solution, prepared as described below, is pumped to the reactor at a rate 233 ml per 3000 gm monomer until 7916 gm fresh feed monomer is fed. This delay in commencing the addition of stabilizing surfactant to the aqueous medium corresponds to a polymer concentration in the aqueous medium of 0.79 wt %, and the metering rate of the surfactant into the aqueous medium is 0.01 g/l-hr. After a total of 8333 gm incremental fresh feed monomer had been fed, corresponding to a total of 510 ml initiator solution and 23.5 hours, monomer and initiator feed is discontinued. The reactor is cooled and the pressure in the reactor reduced to atmospheric. The resulting fluoroelastomer latex has a solids content of 23.6 wt % solids, a pH of 3.17, and an average particle diameter of 260 nm. The latex is coagulated with aluminum sulfate solution, washed with deionized water, and dried. The fluoroelastomer has an inherent viscosity of 0.57 dl/g, a Mooney viscosity, ML (1+10) at 121° C., of 118 and contains 33.5 wt % VF2, 38.4 wt % HFP, and 28.1 wt % TFE.

The stabilizing surfactant solution is prepared as follows: In a 1 liter, jacketed round bottom flask is added 492.5 gm of deionized, deaerated water, 7.5 gm of sodium dodecyl sulfate (ACS Reagent, >99.0%) and 0.225 gm of Fe (+2) sulfate heptahydrate. The contents are agitated until all solids are dissolved. The solution pH is adjusted to 3 with two drops of concentrated Sulfuric Acid. 18.75 gm of 30 wt % hydrogen peroxide is added to the mixture. The mixture is heated to 40° C. while stirring and held at temperature for 2 hours. The solution is discharged and cooled in an ice bath to rapidly bring the fluid to ambient temperature. The final mixture has a pH of 3.

In this example, the amount of passivation adjuvant, $Fe^{+2}$, is 0.603 wt % based on the total weight of the hydrocarbon-containing surfactant, sodium dodecyl sulfate, added to the polymerization reactor. The amount of $Fe^{+2}$ based on water in the reactor at the end of the batch is 2.0 ppm.

Example 16

This Example discloses the polymerization to make fluoroelastomer of TFE/PMVE using sodium dodecyl sulfate as the stabilizing surfactant. Passivation of the stabilizing surfactant is performed prior to its addition to the polymerization reactor.

To a 40 liter, vertically disposed, jacketed, stainless steel autoclave reactor is added 23000 gm of deionized, deaerated water. To the reactor is added an additional 2016 gm of deionized, deaerated water which contains 0.04 gm of Pluronic® 31R1 and 2.02 gm of sodium sulfite. The reactor is purged with start-up monomer mixture (25.0 wt % tetrafluoroethylene (TFE) and 75.0 wt % perfluoromethyl vinyl ether (PMVE)) to 410 kPa and evacuate. This purging procedure is repeated until the oxygen in the reactor is less than 100 ppm. 16 ml initiator solution of 1 wt % ammonium persulfate and 5 wt % disodium phosphate heptahydrate is added to the reactor. The reactor is heated to 80° C. The reactor is pressurized with 2344 grams of start-up monomer (with the above composition). At the end of pressurization, the reactor pressure is 2068 kPa. At time zero, 50 ml of an initiator solution of 1 wt % ammonium persulfate and 5 wt % disodium phosphate heptahydrate is added to the reactor to start polymerization. As the reactor pressure drops, a fresh feed monomer mixture of 50.0 wt % TFE and 50.0 wt % PMVE is fed to the reactor to maintain a 2068 kPa pressure. Additional initiator solution is added in increments of 10 ml every 30 minutes to maintain polymerization rate. After 200 gm of fresh feed monomer mixture has been fed, stabilizing surfactant solution, prepared as described in Example 15, is pumped to the reactor at a rate 233 ml per 3000 gm monomer until 7916 gm fresh feed monomer fed. This delay in commencing the addition of stabilizing surfactant to the aqueous medium corresponds to a PTFE concentration in the aqueous medium of 0.79 wt %, and the metering rate of the surfactant into the aqueous medium is 0.0065 g/l-hr. After a total of 8333 gm incremental fresh feed monomer had been fed, corresponding to a total of 760 ml initiator solution and 36 hours, monomer and initiator fed is discontinued. The reactor is cooled and the pressure in the reactor reduced to atmospheric. The resulting fluoroelastomer latex has a solids content of 22.9 wt % solids, a pH of 3.2, and an average particle diameter of 336 nm. The latex is coagulated with aluminum sulfate solution, washed with deionized water, and dried. The fluoroelastomer has a Mooney viscosity, ML (1+10) at 175° C., of 94 and contains 50.9 wt % TFE and 49.1 wt % PMVE.

In this example, the amount of passivation adjuvant, $Fe^{+2}$, is 0.603 wt % based on the total weight of the hydrocarbon-containing surfactant, sodium dodecyl sulfate, added to the polymerization reactor. The amount of $Fe^{+2}$ based on water in the reactor at the end of the batch is 1.98 ppm.

Example 17

The Example provides the preparation of FEP.

To a 12 liter, horizontally disposed, jacketed, stainless steel reactor with a two blade agitator is added 6000 gm of deionized, deaerated water. To the reactor is added an additional 500 gm of deionized, deaerated water which contains 0.015 gm of Pluronic® 31R1 and 0.1 gm of sodium sulfite. The reactor is sealed and placed under vacuum. The reactor pressure is raised to 30 psig (310 kPa) with nitrogen and evacuated three times. Agitation is begun and the agitator speed is set to 75 RPM. The reactor is heated to 95° C. 2.6 ml of initiator solution containing 22 gm ammonium persulfate per liter of deionized, deaerated water is added to the reactor. The concentrations of surfactant, salt and initiator are 2.3 ppm, 15.4 ppm, and 8.8 ppm, respectively.

HFP and TFE are charged to the reactor in a weight ratio of 1.857/1 HFP/TFE in order to bring the reactor pressure to 435 psig (3.10 MPa). At time zero, 30 ml of the above initiator solution is charged to the reactor at 80 ml/min and then the initiator is continuously pumped at 1.5 ml/min until the end of the run. Kickoff occurs after 3.5 minutes from the start of initiator injection when the reactor pressure drops to 425 psig (3.03 MPa). For the duration of the run, reactor pressure is controlled at 425 psig (3.03 MPa) with addition of TFE. After 300 gm of TFE has been fed since kickoff, a surfactant solution containing 1.45 gm of passivated sodium dodecyl sulfate per 100 gm of solution is pumped to the reactor at a rate of 0.75 ml/min until the end of the run. The delay in commencing the addition of stabilizing surfactant to the aqueous medium is 37.5 min and corresponds to an FEP concentration in the aqueous medium of 4.9 wt %. The metering rate of the surfactant into the aqueous medium is 0.054 g/l-hr. The passivation treatment of the stabilizing surfactant (SDS) is the same as set forth in Example 9. After 248 minutes since kickoff, 2000 gm of TFE and 158 ml of surfactant solution has been added to the reactor. The agitator is stopped, the reactor is vented to atmospheric pressure and the dispersion is discharged. 8.70 kg of aqueous dispersion is produced with 23.2 wt % solids content and 165 nm raw dispersion particle size. Coagulum obtained from filtering the dispersion through cheesecloth and from cleaning the reactor is dried in a vacuum oven and measures 270 gm. Polymer is isolated by freezing a dispersion sample followed by thawing, filtration, washing and drying. The polymer contains 10.6 wt % HFP as measured by FTIR and has a melting point of 273° C.

What is claimed is:

1. A process for polymerizing fluoromonomer to form a dispersion of fluoropolymer particles in an aqueous medium in a polymerization reactor, which comprises adding to the polymerization reactor:
   aqueous medium,
   polymerization initiator,
   fluoromonomer, and
   hydrocarbon-containing surfactant,
and passivating the hydrocarbon-containing surfactant, said passivating being carried out by reacting said hydrocarbon-containing surfactant with an oxidizing agent selected from the group consisting of hydrogen peroxide and polymerization initiator, said passivating being carried out in the presence of a passivation adjuvant comprising transition metal ion, wherein the hydrocarbon-containing surfactant is a compound of the formula R-L-M wherein R is an alkyl group containing from 6 to 17 carbon atoms, L is selected from the group consisting of $-ArSO_3^-$, $-SO_3^-$, $-OSO_3$, $-PO_3^-$ and $-COO^-$, wherein Ar is an aryl group, and M is a univalent cation selected from $H^+$, $Na^+$, $K^+$ and $NH_4^+$,
wherein no halogen-containing surfactant is added to the aqueous medium, and
wherein the fluoropolymer is selected from the group consisting of polytetrafluoroethylene, modified polytetrafluoroethylene, and melt-processible compolymer comprising at least 40-99 mol % tetrafluoroethylene units and about 1-60 mol % of at least one other monomer.

2. The process according to claim 1 wherein the metal of said metal ion is selected from Mn, Fe, Co, Ni, Cu, Zn, Ce, and Ag.

3. The process according to claim 1 where the metal ion is ferrous ion or cuprous ion.

4. The process according to claim 1 wherein the amount of passivation adjuvant is 2 wt % or less than 2 wt % based on the total weight of the hydrocarbon-containing surfactant added to the polymerization reactor.

5. The process according to claim 1 wherein the hydrocarbon-containing surfactant is passivated prior to addition to the polymerization reactor.

6. The process according to claim 1 wherein the hydrocarbon-containing surfactant is passivated during or after addition to the polymerization reactor.

7. The process of according to claim 6 wherein said hydrocarbon containing surfactant is passivated by reacting said hydrocarbon-containing surfactant with polymerization initiator.

8. The process according to claim 7 wherein said hydrocarbon-containing surfactant is added to the polymerization reactor after commencement of said polymerizing.

9. The polymerization process according to claim 8 further comprising adding passivation adjuvant to the polymerization reactor after commencement of said polymerizing.

10. The polymerization process according to claim 9 wherein said passivation adjuvant is present in the polymerization reactor when said stabilizing surfactant is added.

11. The process according to claim 1 wherein said fluoropolymer particles are polytetrafluoroethylene particles and said polymerizing is carried out to wherein said dispersion of polytetrafluoroethylene particles constitute 45 wt % or greater than 45 wt % of said aqueous medium.

12. The process according to claim 11 wherein 3000 ppm or greater than 3000 ppm of said hydrocarbon-containing surfactant is added to said reactor.

13. The polymerization process according to claim 1 wherein the passivation of said hydrocarbon-containing surfactant reduces its telogenic effect, which is characterized by an increase in space-time-yield of said polymerizing of at least 10% as compared to a polymerization process wherein said hydrocarbon-containing surfactant is not passivated.

14. The process of claim 1 wherein the fluoropolymer of the dispersion of fluoropolymer particles produced by the process is perfluoroplastic.

15. A fluoropolymer dispersion made by the process according to claim 1.

16. A fluoropolymer resin made by isolation from the fluoropolymer dispersion of claim 15.

\* \* \* \* \*